(12) United States Patent
Lee et al.

(10) Patent No.: US 9,645,596 B1
(45) Date of Patent: May 9, 2017

(54) METHOD AND APPARATUS FOR FACILITATING THE OPERATION OF AN ON-SITE ENERGY STORAGE SYSTEM TO CO-OPTIMIZE BATTERY DISPATCH

(71) Applicant: Advanced Microgrid Solutions, Inc., San Francisco, CA (US)

(72) Inventors: Ja-Chin Audrey Lee, San Francisco, CA (US); Corey Noone, San Francisco, CA (US); Kate Knox, San Francisco, CA (US)

(73) Assignee: Advanced Microgrid Solutions, Inc., San Francisco, CA (US)

( * ) Notice: Subject to any disclaimer, the term of this patent is extended or adjusted under 35 U.S.C. 154(b) by 0 days.

(21) Appl. No.: 15/360,335

(22) Filed: Nov. 23, 2016

(51) Int. Cl.
| | |
|---|---|
| G05D 17/00 | (2006.01) |
| G05D 5/00 | (2006.01) |
| G05D 9/00 | (2006.01) |
| G05D 3/12 | (2006.01) |
| G05D 11/00 | (2006.01) |
| G05F 1/66 | (2006.01) |
| H02J 7/00 | (2006.01) |

(52) U.S. Cl.
CPC .............. *G05F 1/66* (2013.01); *H02J 7/0021* (2013.01)

(58) Field of Classification Search
CPC ................................. G05F 1/66; H02J 7/0021
See application file for complete search history.

(56) References Cited

U.S. PATENT DOCUMENTS

| 8,412,623 B2 * | 4/2013 | Moon .................... G06Q 20/04 705/39 |
| 8,880,682 B2 * | 11/2014 | Bishop ................ G06F 11/3495 709/203 |
| 9,134,353 B2 * | 9/2015 | Jia .......................... G06Q 40/04 |
| 2010/0218108 A1 * | 8/2010 | Crabtree ................ G06Q 50/06 715/738 |
| 2010/0332373 A1 * | 12/2010 | Crabtree ................ G06Q 50/06 705/37 |
| 2011/0145657 A1 * | 6/2011 | Bishop ................ G06F 11/3495 714/47.1 |
| 2013/0218698 A1 * | 8/2013 | Moon .................... G06Q 20/04 705/21 |

(Continued)

*Primary Examiner* — Ramesh Patel
(74) *Attorney, Agent, or Firm* — Alston & Bird LLP

(57) ABSTRACT

Various embodiments are provided for facilitating the operation and control of a fleet of on-site energy assets and optimizing energy dispatch across the fleet, thereby facilitating the use of the on-site energy assets instead of grid-supplied electric consumption. An example system may comprise a central platform and a plurality of on-site gateway devices configured to perform on-site asset control. An example method may comprise receiving a service availability call, performing fleet-level optimization, generating a set of site-level schedules, and causing, as a function of the site-level schedules, real-time on-site asset control. Other embodiments provide for determining a location of each grid-connected energy consumer at which to reduce grid-supplied energy consumption, determining an amount of a reduction of grid-supplied energy consumption, and transmitting a signal to each corresponding gateway device located at the determined location, the signal comprising data indicative of instructions for performing on-site energy dispatch.

30 Claims, 11 Drawing Sheets

(56) References Cited

U.S. PATENT DOCUMENTS

2015/0094968 A1* 4/2015 Jia .................... G06Q 40/04
 702/60
2015/0185716 A1* 7/2015 Wichmann ............ F01K 23/101
 700/287

* cited by examiner

METHOD AND APPARATUS FOR FACILITATING THE OPERATION OF AN ON-SITE ENERGY STORAGE SYSTEM TO CO-OPTIMIZE BATTERY DISPATCH

TECHNOLOGICAL FIELD

Embodiments of the present invention relate generally to facilitating the operation and control of a fleet of on site (e.g., customer-sited) energy assets that may include energy storage systems, renewable fuel or diesel generators, gas turbines, or the like, and in particular to methods, apparatus, and computer program products for optimizing energy dispatch across this fleet to provide an energy provider (e.g., a utility, a system operator, or a retail energy provider) with firm capacity, for example, for purposes of resource adequacy, other services or market products at specific market nodes and to reduce the electric costs for end customers with these controllable assets located on-premises.

BACKGROUND

Conventional systems require electric transmission and distribution system operators and utilities to build infrastructure to support peak demand, the costs of which are passed on to the customer, for example, via tariffs including demand response programs, market-based pricing, and other time-based pricing. While incentives may be offered to reduce demand during peak times, customers are often not in a position to do so through conventional load reduction and load shifting measures and as such, have instead attempted to employ the use of, for example, on-site energy storage systems (e.g., batteries) or other energy assets. However, the customer then bears the cost of having the on-site energy storage system installed, maintained, and operated and, furthermore, bears the risk that the cost savings do not justify the expenditures. Moreover, the utilities generally have no control over the deployment and operation of the on-site energy storage systems deployed in the field and cannot rely on these resources like other traditional generators as firm capacity products, for purposes such as resource adequacy.

In this regard, areas for improving known and existing systems have been identified. Through applied effort, ingenuity, and innovation, solutions to improve such systems have been realized and are described in connection with embodiments of the present invention.

BRIEF SUMMARY

A method, apparatus and computer program product are therefore provided according to an example embodiment of the present invention for operating an on-site energy asset such as an on-site energy storage system to co-optimize asset or energy dispatch, thus providing an energy provider (e.g., a utility, a system operator, or a retail energy provider) with firm electric capacity at specific locations and providing tariff cost benefits for an end customer (e.g., reducing their monthly electric bill). Such a system is well suited for multiple applications, including back-up/emergency power, behind-the-meter grid support, peak shaving to reduce demand charges and time of day electrical cost, and as the basis for a micro-grid.

In some embodiments, a system may be provided, the system comprising a platform apparatus, and an on-site gateway apparatus, the platform apparatus comprising at least one processor and at least one memory including computer program code, the at least one memory and the computer program code configured to, with the processor, cause the apparatus to calculate site load curves indicating predicted site load of a customer at each of a plurality of periods of a day as a function of one or more of historical meter and billing data, in consideration of other existing on-site generation resources, and market or weather data, for each of one or more customers with on-site energy assets within a given portfolio aggregation, perform portfolio-level optimization as a function of the site load curves and a tariff library, the portfolio-level optimization configured to segment the site load curves in accordance with tariff periods and other site-level restrictions, and for each segment, calculate and output a power consumption maximum threshold, generate a set of site-level schedules, as a function of the portfolio-level optimization and one or more site restrictions, the set of site-level schedules configured to be provided to a gateway apparatus for facilitating the use of on-site controllable assets instead of grid-supplied electric consumption, and the gateway apparatus comprising at least one processor and at least one memory including computer program code, the at least one memory and the computer program code configured to, with the processor, cause the apparatus to receive the site-level schedule from the platform device and store that site-level schedule locally, at a start time of a given segment, provide instructions to facilitate real-time or near real-time on-site asset control.

In some embodiments, the on-site energy assets comprise energy storage resources and the site-level restrictions comprise instructions on battery charging and discharging. In some embodiments, the computer program code configured to facilitate the on-site asset control, further comprises computer program code configured to, with the processor, cause the apparatus to during a segment in which a customer's tariff or rate is less than a pre-defined threshold and site-level restrictions permit charging, cause the predicted site load to be satisfied via grid-supplied electric consumption and allowing charging of the battery to the extent that the predicted site load does not meet the scheduled maximum threshold. In some embodiments, the computer program code configured to facilitate the on-site asset control, further comprises computer program code configured to, with the processor, cause the apparatus to during a segment in which a customer's tariff or rate is less than a pre-defined threshold and site-level restrictions do not permit charging, cause the predicted site load to be satisfied via grid-supplied electric consumption and dis-allowing charging of the battery. In some embodiments, the computer program code configured to facilitate the on-site asset control, further comprises computer program code configured to, with the processor, cause the apparatus to during a segment a customer's tariff or rate is greater than a pre-defined threshold and the site-level restrictions do not permit charging, cause the predicted site load to be satisfied via grid-supplied electric consumption up to a scheduled maximum threshold and causing any remaining portion of the predicted site load to be satisfied via electricity generation of the on-site energy asset and preventing charging of the battery.

In some embodiments, the computer program code configured to facilitate the on-site asset control, further comprises computer program code configured to, with the processor, cause the apparatus to prevent net export to the grid caused by electricity generation of the energy asset, should that site restriction exist from utility, interconnection, or other regulations and requirements.

In some embodiments, the energy storage resources comprise battery systems. In some embodiments, the computer program code configured to facilitate the on-site asset control, further comprises computer program code configured to, with the processor, cause the apparatus to prevent net export to the grid caused by user of the on-site energy assets, should that site restriction exist from utility, interconnection, or other regulations and requirements. In some embodiments, the on-site energy assets comprise one or more of renewable or non-renewable fuel generators or turbines.

In some embodiments, a method may be provided, the method comprising calculating site load curves indicating predicted site load of a customer at each of a plurality of periods of a day as a function of one or more of historical meter and billing data, in consideration of other existing on-site generation resources, and market or weather data, for each of one or more customers with on-site energy assets within a given portfolio aggregation, performing portfolio-level optimization as a function of the site load curves and a tariff library, the portfolio-level optimization configured to segment the site load curves in accordance with tariff periods and other site-level restrictions, and for each segment, calculate and output a power consumption maximum threshold, generating a set of site-level schedules, as a function of the portfolio-level optimization and one or more site restrictions, the set of site-level schedules configured to be provided to a gateway apparatus for facilitating the use of on-site controllable assets instead of grid-supplied electric consumption, and transmitting the site-level schedule to a gateway device, and causing, at a start time of a given segment, real-time or near real-time on-site asset control.

In some embodiments, the on-site energy assets comprise energy storage resources and the site-level restrictions comprise instructions on battery charging and discharging. In some embodiments, the on-site asset control, further comprises during a segment in which a customer's tariff or rate is less than a pre-defined threshold and site-level restrictions permit charging, causing the predicted site load to be satisfied via grid-supplied electric consumption and allowing charging of the battery to the extent that the predicted site load does not meet the scheduled maximum threshold. In some embodiments, the on-site asset control, further comprises during a segment in which a customer's tariff or rate is less than a pre-defined threshold and site-level restrictions do not permit charging, causing the predicted site load to be satisfied via grid-supplied electric consumption and dis-allowing charging of the battery. In some embodiments, the on-site asset control, further comprises during a segment in which a customer's tariff or rate is greater than a pre-defined threshold and the site-level restrictions do not permit charging, causing the predicted site load to be satisfied via grid-supplied electric consumption up to a scheduled maximum threshold and causing any remaining portion of the predicted site load to be satisfied via electricity generation of the on-site energy asset and preventing charging of the battery. In some embodiments, the on-site asset control, further comprises preventing net export to the grid caused by electricity generation of the energy asset, should that site restriction exist from utility, interconnection, or other regulations and requirements.

In some embodiments, the energy storage resources comprise battery systems. In some embodiments the method may further comprise preventing net export to the grid caused by user of the on-site energy assets, should that site restriction exist from utility, interconnection, or other regulations and requirements. In some embodiments, the on-site energy assets comprise one or more of renewable or non-renewable fuel generators or turbines.

In some embodiments, a computer program product may be provided comprising at least one non-transitory computer-readable storage medium having computer-executable program code instructions stored therein, the computer-executable program code instructions comprising program code instructions for calculating site load curves indicating predicted site load of a customer at each of a plurality of periods of a day as a function of one or more of historical meter and billing data, in consideration of other existing on-site generation resources, and market or weather data, for each of one or more customers with on-site energy assets within a given portfolio aggregation, performing portfolio-level optimization as a function of the site load curves and a tariff library, the portfolio-level optimization configured to segment the site load curves in accordance with tariff periods and other site-level restrictions, and for each segment, calculate and output a power consumption maximum threshold, generating a set of site-level schedules, as a function of the portfolio-level optimization and one or more site restrictions, the set of site-level schedules configured to be provided to a gateway apparatus for facilitating the use of on-site controllable assets instead of grid-supplied electric consumption, transmitting the site-level schedule to a gateway device, and causing, at a start time of a given segment, real-time or near real-time on-site asset control.

In some embodiments, the on-site energy assets comprise energy storage resources and the site-level restrictions comprise instructions on battery charging and discharging. In some embodiments, the computer program code configured to facilitate the on-site asset control, further comprise program code instructions for during a segment in which a customer's tariff or rate is less than a pre-defined threshold and site-level restrictions permit charging, causing the predicted site load to be satisfied via grid-supplied electric consumption and allowing charging of the battery to the extent that the predicted site load does not meet the scheduled maximum threshold. In some embodiments, the computer program code configured to facilitate the on-site asset control, further comprise program code instructions for during a segment in which a customer's tariff or rate is less than a pre-defined threshold and site-level restrictions do not permit charging, causing the predicted site load to be satisfied via grid-supplied electric consumption and dis-allowing charging of the battery. In some embodiments, the computer program code configured to facilitate the on-site asset control, further comprise program code instructions for during a segment a customer's tariff or rate is greater than a pre-defined threshold and the site-level restrictions do not permit charging, causing the predicted site load to be satisfied via grid-supplied electric consumption up to a scheduled maximum threshold and causing any remaining portion of the predicted site load to be satisfied via electricity generation of the on-site energy asset and preventing charging of the battery. In some embodiments, the computer program code configured to facilitate the on-site asset control, further comprise program code instructions for preventing net export to the grid caused by electricity generation of the energy asset, should that site restriction exist from utility, interconnection, or other regulations and requirements. In some embodiments, the energy storage resources comprise battery systems.

In some embodiments, the computer program code configured to facilitate the on-site asset control, further comprise program code instructions for preventing net export to the grid caused by user of the on-site energy assets, should that site restriction exist from utility, interconnection, or other regulations and requirements. In some embodiments, the on-site energy assets comprise one or more of renewable or non-renewable fuel generators or turbines.

In some embodiments, a system may be provided, the system configured to perform fleet-level management for reducing grid-supplied energy consumption with a firm capacity reduction, the system comprising a platform apparatus and a plurality of gateway apparatus, the plurality of gateway apparatus comprising at least a first gateway apparatus located at a first location, the first location being on-site of a grid-connected energy consumer and the second gateway apparatus located at a second location, the second location being on a different site of the grid-connected energy consumer or a different grid-connected energy consumer, each of the plurality of gateway apparatus configured to control an on-site energy asset, comprising at least an energy asset device, to control use of on-site energy instead of grid-supplied energy consumption, the platform apparatus comprising at least one processor and at least one memory including computer program code, the at least one memory and the computer program code configured to, with the processor, cause the apparatus to receive or access input data, determine, as a function of the input data, a location of each grid-connected energy consumers at which to reduce grid-supplied energy consumption, determine an amount of a reduction of grid-supplied energy consumption, and further allocate a total reduction across the systems of each grid-connected energy consumer, transmit a signal to each corresponding gateway device located at the determined location, the signal comprising data indicative of instructions for performing on-site energy dispatch.

In some embodiments, the instructions are configured to override a previously supplied site-level schedule and increase on-site asset usage. In some embodiments, the at least one memory and the computer program code are further configured to, with the processor, cause the apparatus to receive a utility request, the utility request comprising at least a geographic area or set of substations and time period at which to reduce grid-supplied energy consumption, and perform fleet-level optimization to determine which one or more of the plurality of gateway apparatus to instruct to perform on-site energy dispatch and at what times, thus reducing grid-supplied energy consumption in consideration of net export restrictions where applicable, and providing one or more site-level schedules to each of a plurality of affected gateway apparatuses for facilitating control of on-site energy asset usage and grid-supplied electric consumption. In some embodiments, fleet-level optimization comprises maximizing a sum of a total bill savings across all accounts and utility revenue minus amortized development cost. In some embodiments, fleet-level optimization is a function of a bill savings amount of each of the grid-connected energy consumers. In some embodiments, fleet-level optimization is a function of utility revenue, the utility revenue being a function of an amount of on-site energy dispatched. In some embodiments, fleet-level optimization is a function of a development cost, the development cost being a function of one or more of on-site energy storage system cost, installation cost, maintenance cost, and operational cost.

In some embodiments, a method may be provided for performing fleet-level management for reducing grid-supplied energy consumption with a firm capacity reduction, the method comprising receiving or accessing input data from a plurality of gateway apparatus, the plurality of gateway apparatus comprising at least a first gateway apparatus located at a first location, the first location being on-site of a grid-connected energy consumer and the second gateway apparatus located at a second location, the second location being on a different site of the grid-connected energy consumer or a different grid-connected energy consumer, each of the plurality of gateway apparatus configured to control an on-site energy asset, comprising at least an energy asset device, to control use of on-site energy instead of grid-supplied energy consumption, determining, as a function of the input data, a location of each grid-connected energy consumers at which to reduce grid-supplied energy consumption, determining an amount of a reduction of grid-supplied energy consumption, and further allocate a total reduction across the systems of each grid-connected energy consumer, transmitting a signal to each corresponding gateway device located at the determined location, the signal comprising data indicative of instructions for performing on-site energy dispatch.

In some embodiments, the instructions are configured to override a previously supplied site-level schedule and increase on-site asset usage. In some embodiments the method further comprise receiving a utility request, the utility request comprising at least a geographic area or set of substations and time period at which to reduce grid-supplied energy consumption, and performing fleet-level optimization to determine which one or more of the plurality of gateway apparatus to instruct to perform on-site energy dispatch and at what times, thus reducing grid-supplied energy consumption in consideration of net export restrictions where applicable, and providing one or more site-level schedules to each of a plurality of affected gateway apparatuses for facilitating control of on-site energy asset usage and grid-supplied electric consumption.

In some embodiments, fleet-level optimization comprises maximizing a sum of a total bill savings across all accounts and utility revenue minus amortized development cost. In some embodiments, fleet-level optimization is a function of a bill savings amount of each of the grid-connected energy consumers. In some embodiments, fleet-level optimization is a function of utility revenue, the utility revenue being a function of an amount of on-site energy dispatched. In some embodiments, fleet-level optimization is a function of a development cost, the development cost being a function of one or more of on-site energy storage system cost, installation cost, maintenance cost, and operational cost.

In some embodiments, a computer program product may be provided for performing fleet-level management for reducing grid-supplied energy consumption with a firm capacity reduction, the computer program product comprising at least one non-transitory computer-readable storage medium having computer-executable program code instructions stored therein, the computer-executable program code instructions comprising program code instructions for receiving or accessing input data from a plurality of gateway apparatus, the plurality of gateway apparatus comprising at least a first gateway apparatus located at a first location, the first location being on-site of a grid-connected energy consumer and the second gateway apparatus located at a second location, the second location being on a different site of the grid-connected energy consumer or a different grid-connected energy consumer, each of the plurality of gateway apparatus configured to control an on-site energy asset, comprising at least an energy asset device, to control use of on-site energy instead of grid-supplied energy consumption, determining, as a function of the input data, a location of each grid-connected energy consumers at which to reduce grid-supplied energy consumption, determining an amount of a reduction of grid-supplied energy consumption, and further allocate a total reduction across the systems of each grid-connected energy consumer, transmitting a signal to each corresponding gateway device located at the determined location, the signal comprising data indicative of instructions for performing on-site energy dispatch.

In some embodiments, the instructions are configured to override a previously supplied site-level schedule and increase on-site asset usage. In some embodiments, the computer-executable program code instructions further comprise program code instructions for receiving a utility request, the utility request comprising at least a geographic area or set of substations and time period at which to reduce grid-supplied energy consumption, and performing fleet-level optimization to determine which one or more of the plurality of gateway apparatus to instruct to perform on-site energy dispatch and at what times, thus reducing grid-supplied energy consumption in consideration of net export restrictions where applicable, and providing one or more site-level schedules to each of a plurality of affected gateway apparatuses for facilitating control of on-site energy asset usage and grid-supplied electric consumption.

In some embodiments, fleet-level optimization comprises maximizing a sum of a total bill savings across all accounts and utility revenue minus amortized development cost. In some embodiments, fleet-level optimization is a function of a bill savings amount of each of the grid-connected energy consumers. In some embodiments, fleet-level optimization is a function of utility revenue, the utility revenue being a function of an amount of on-site energy dispatched. In some embodiments, fleet-level optimization is a function of a development cost, the development cost being a function of one or more of on-site energy storage system cost, installation cost, maintenance cost, and operational cost.

BRIEF DESCRIPTION OF THE DRAWINGS

Figure 1:
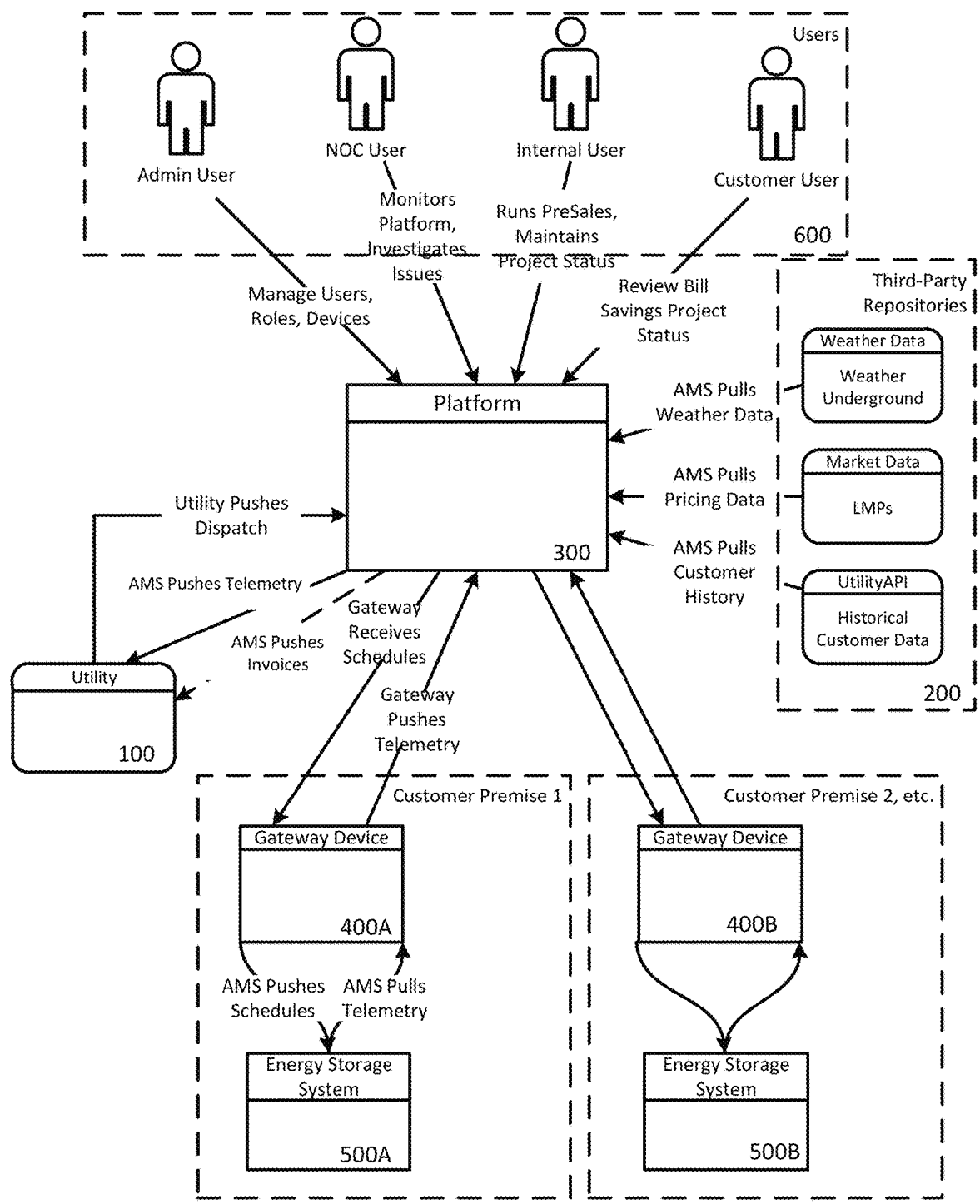
Figure 2:
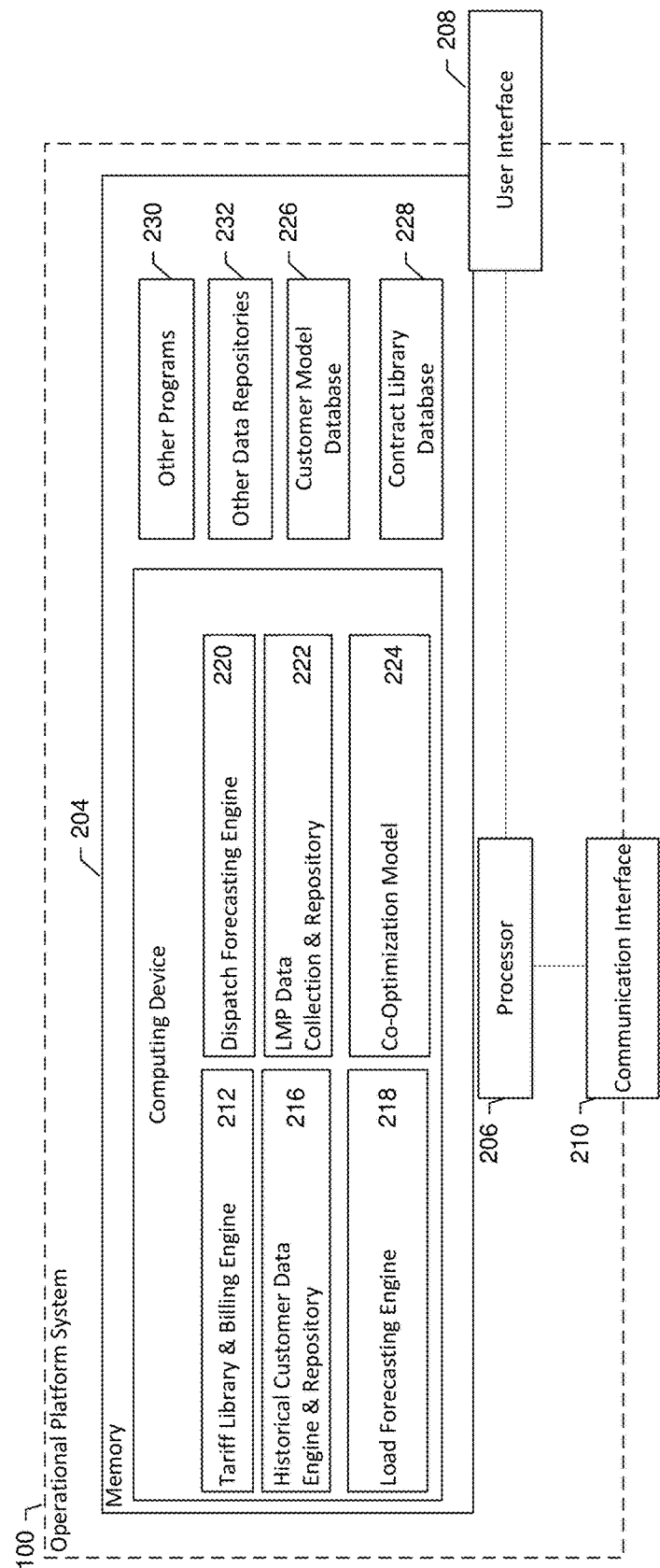
Figure 3:
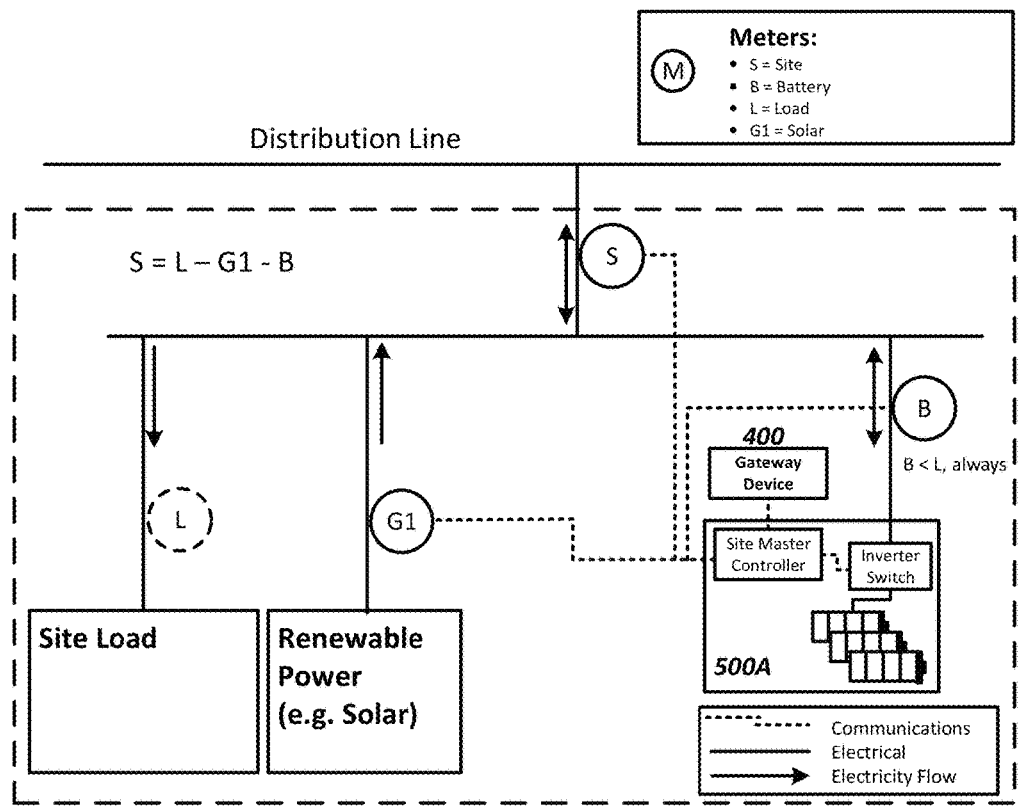
Figure 4:
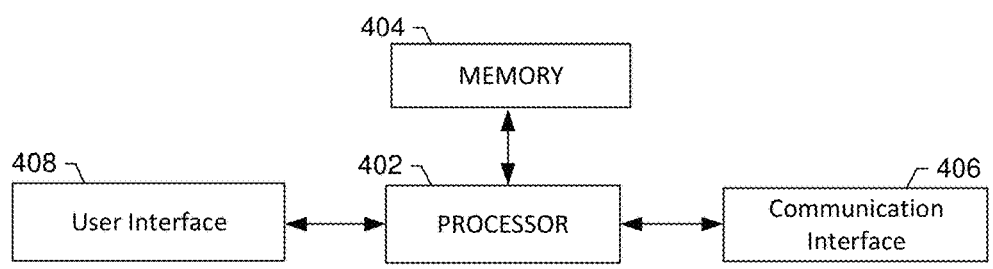
Figure 5:
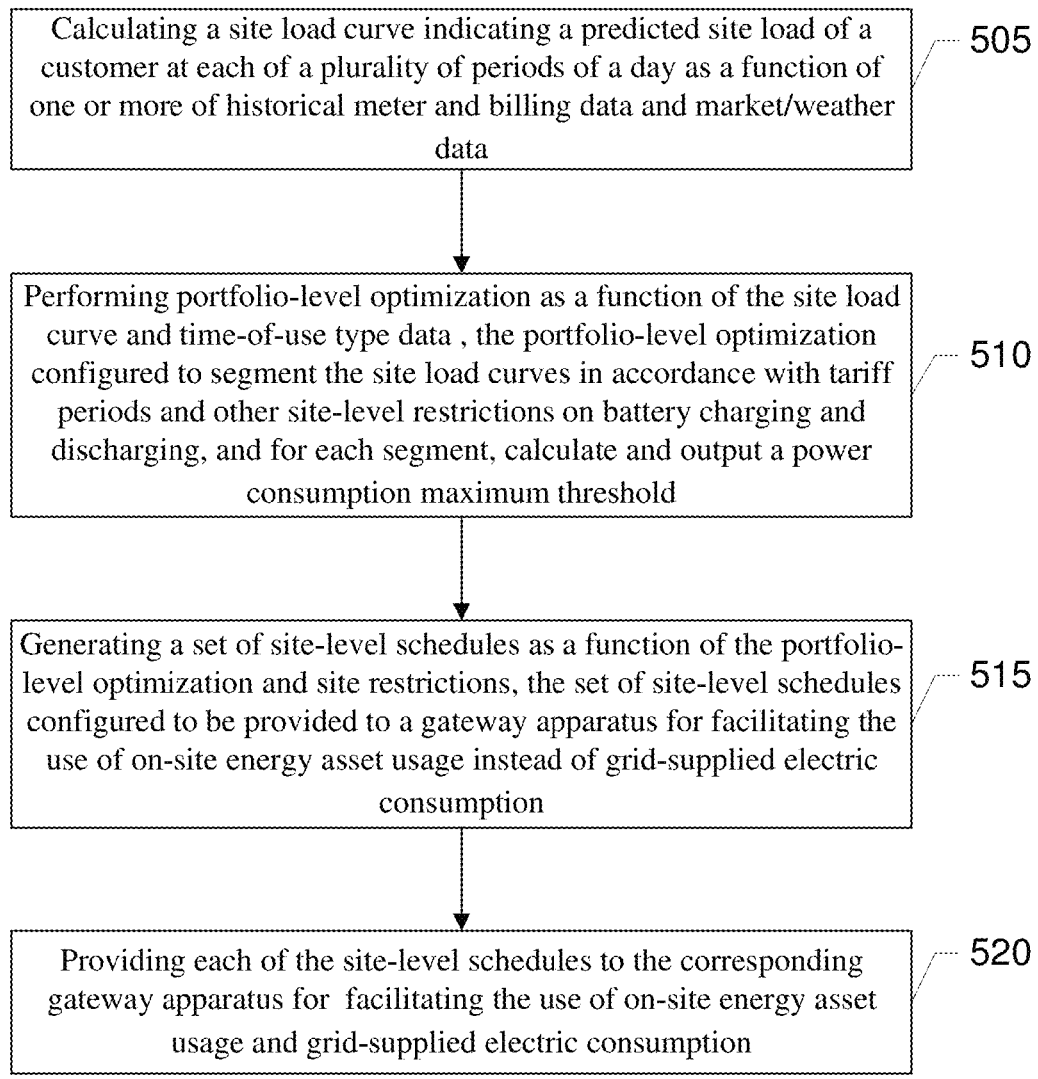
Figure 6:
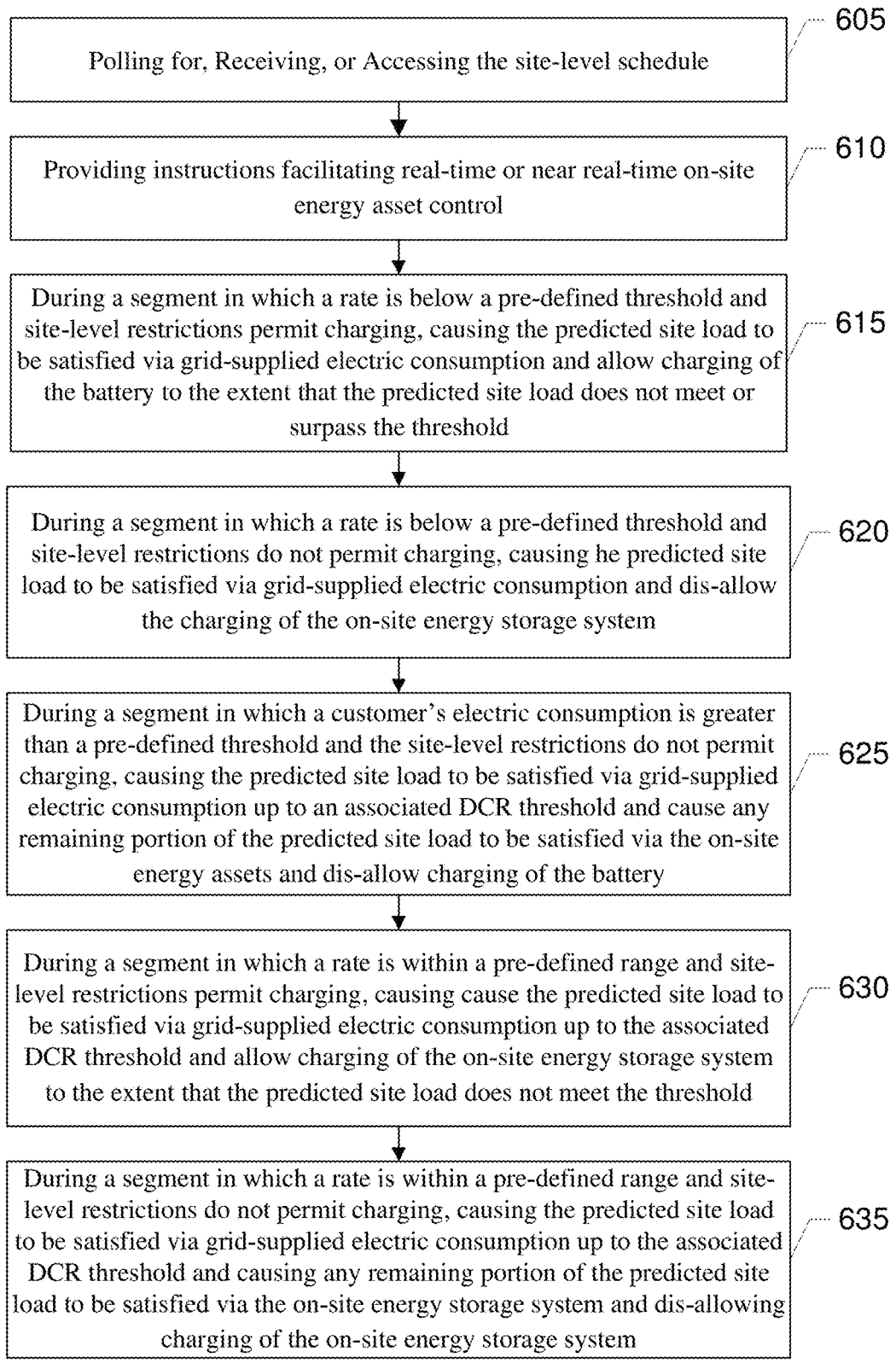
Figure 7:
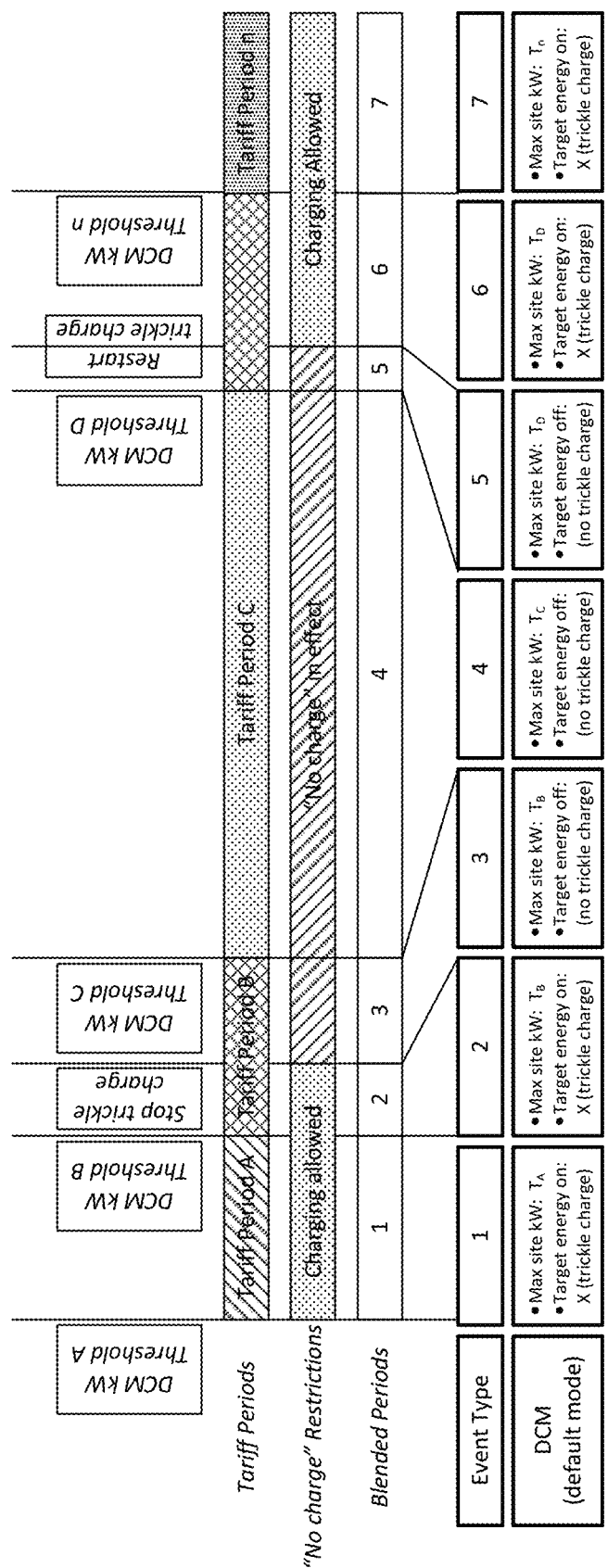
Figure 8:
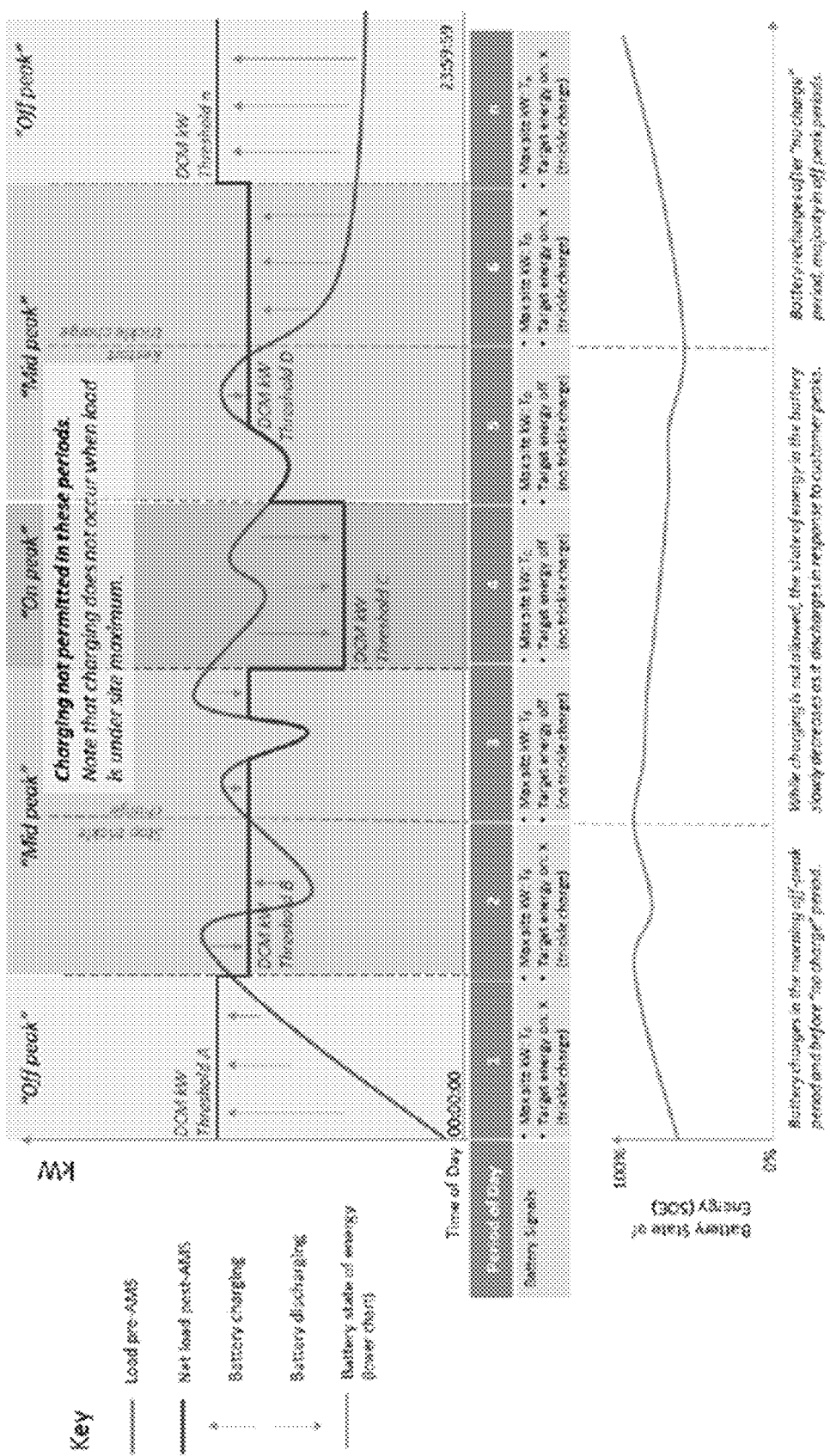
Figure 9:
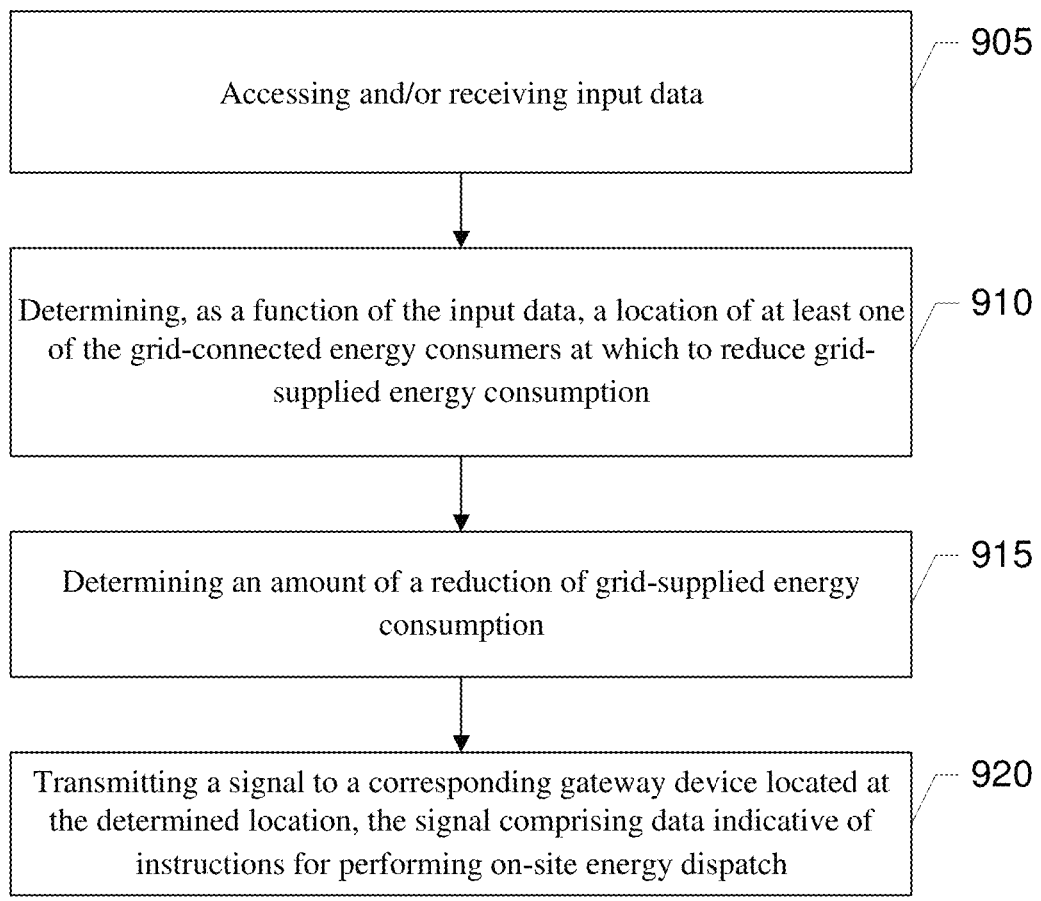
Figure 10:
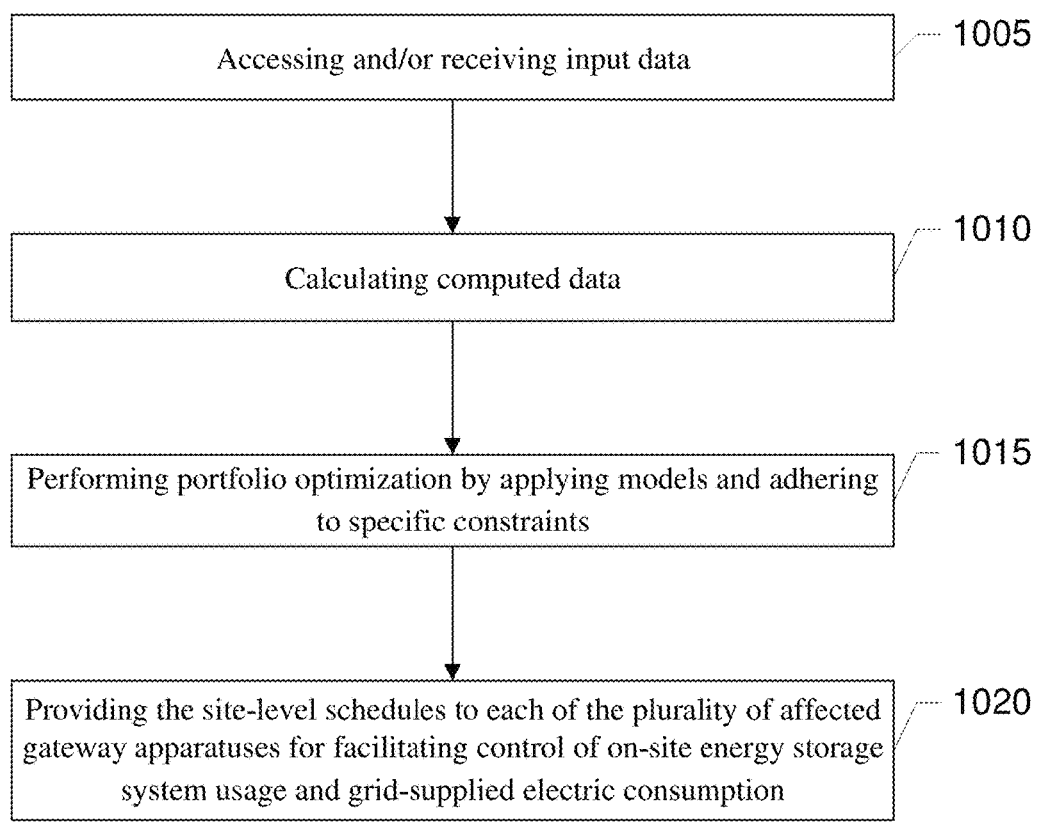
Figure 11:
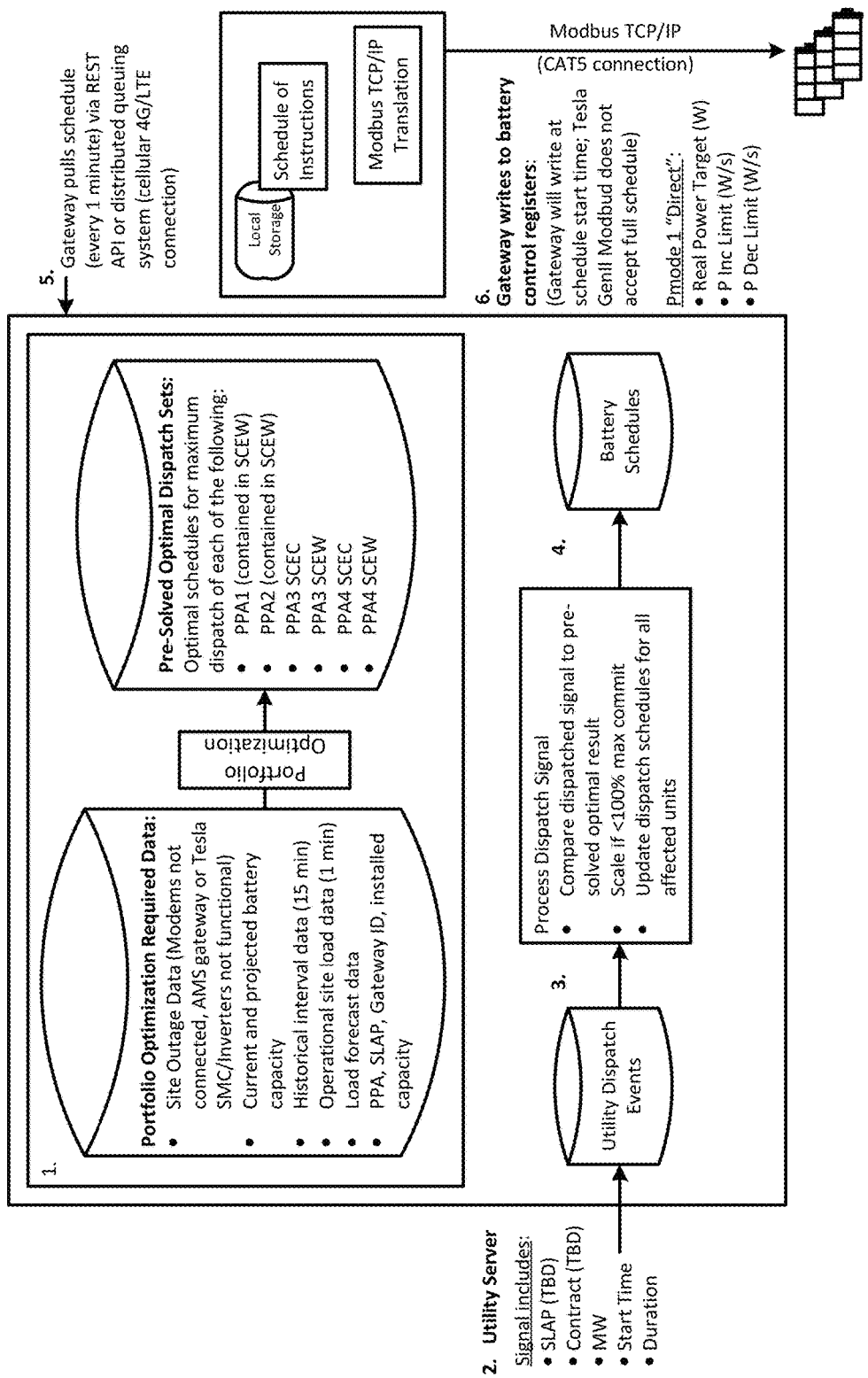
Figure 12:
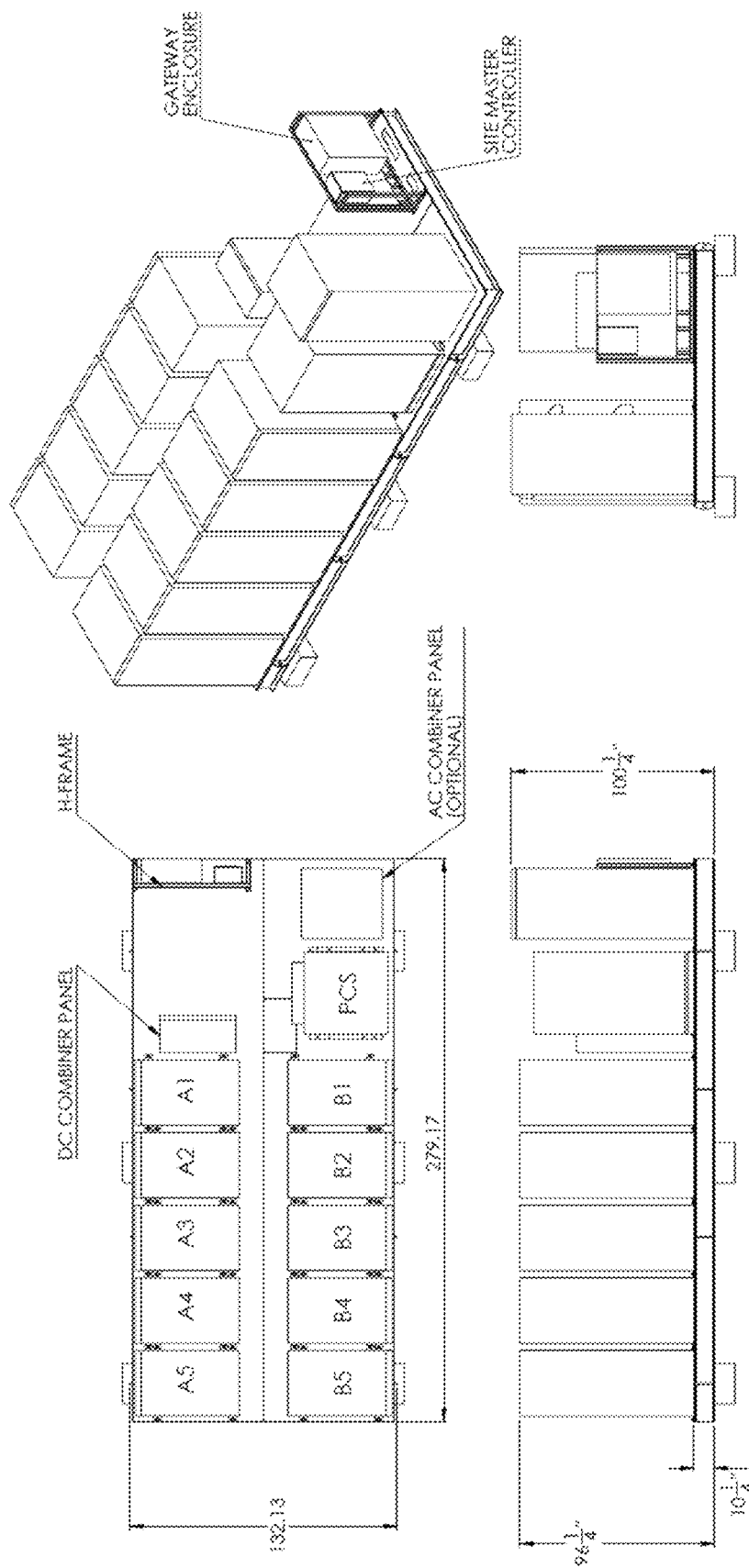

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is block diagram showing an exemplary embodiment of the operation platform that may be specifically configured in accordance with an example embodiment of the present invention;

FIG. 3 is block diagram showing an exemplary site level diagram that may be specifically configured in accordance with an example embodiment of the present invention;

FIG. 4 is a block diagram of an apparatus that may be specifically configured in accordance with an example embodiment of the present invention;

FIG. 5 is a flowchart showing an exemplary method of operating an example apparatus in accordance with an embodiment of the present invention;

FIG. 6 is a flowchart showing an exemplary method of operating an example apparatus in accordance with an embodiment of the present invention;

FIG. 7 illustrates an exemplary site-level schedule that may be generated in accordance with an example embodiment of the present invention;

FIG. 8 illustrates an exemplary segmented site level load curve that may be utilized in accordance with an example embodiment of the present invention;

FIG. 9 is a flowchart showing an exemplary method of operating an example apparatus in accordance with an embodiment of the present invention;

FIG. 10 is a flowchart showing an exemplary method of operating an example apparatus in accordance with an embodiment of the present invention;

FIG. 11 is a data flow diagram showing an exemplary flow of data in accordance with an embodiment of the present invention and FIG. 12 is block diagram of a system that may be specifically configured in accordance with an example embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

The term energy assets or controllable assets, as used herein may refer to one or more energy storage systems (i.e. the lithium-ion battery systems) or any other energy sources such as diesel generators, gas turbines, etc. The term firm capacity as used herein may refer to the amount of energy available for production or transmission that may be guaranteed to be available at a given time. The term energy provider as used herein may refer to a utility, a system operator, a retail energy provider, or the like.

Overview

Embodiments of the present invention generally related to a system to co-optimize battery dispatch across a fleet of behind-the-meter energy storage units (1) to provide an energy provider with firm capacity at specific market nodes and (2) to minimize electric costs for the end customer (e.g., lower their monthly electric bill). The system may be configured to provide behind-the-meter operations at a host site (i.e. on site or customer-sited), communicate with the energy provider, and utilize controllable assets such as, for example, third-party provided energy storage systems (e.g., site controller/inverter/batteries). The system may be configured to provide pre-sales analytical services and/or operational service, each utilizing the same software infrastructure, which is described below, as well as individually configured models that perform the fleet-wide co-optimization calculations.

The platform may be configured to coordinate aggregated local capacity dispatch for an energy supply and distribution system, as well as provide behind-the-meter operations at one or more host customer sites, for example, utilizing controllable assets such as third party provided energy storage system hardware at the host customer sites. The operational platform may be configured to implement demand charge reduction and more general tariff optimization for the host customer sites as well as aggregated local capacity dispatch for the energy supply and distribution system.

The operational platform may be configured for communication with the energy provider to receive event signals and send telemetry data, communication with the distributed controllable assets (e.g., energy storage systems), optimization of energy dispatch in response to event signals received from the energy provider, and optimization of energy dispatch to reduce energy costs for the customer, one aspect of which is Demand Charge Reduction (DCR).

System Architecture

FIG. 1, shown below, is a high-level diagram showing the hardware infrastructure and data flow between the electric utility 100, various third-party repositories 200, and the AMS system, which comprises an operations platform 300 as well as gateway devices 400A-400N, and an energy storage system 500A-500N that, as shown in FIG. 2, comprises a local controller, an inverter, a DC combiner panel, and batteries at each site.

The operational platform 300 may be configured to communicate with each of a plurality of gateway devices 400A-400N, each located at a host customer site in conjunction with an energy storage system 500A-500N, the energy provider 100, third-party resources that may provide useful/necessary data (i.e., third-party repositories 200), and various types of users. The operational platform 300 may be configured to utilize, for example, historical meter and billing data, a tariff library, and market/weather data to perform site-level and portfolio-level forecasting and optimization and generate site-level schedules that are then provided to the on-site gateway devices. Telemetry data may be received from the on-site gateway devices, aggregated, and transmitted to the utility. FIG. 2 shows the platform device in more detail.

The gateway device is located at a customer site. The gateway device may be configured to receive the site-level schedule data from the operation platform 300 and implement an energy dispatch plan according to the schedule data by instructing the local controller 500A to implement real-time or near real-time energy dispatch.

The controllable asset system 500A, which may be embodied as an energy storage system, may comprise, for example, a local controller, an inverter, a DC combiner panel, and a battery. The local controller may be configured to receive, in real-time or near real-time, instructions regarding battery dispatch and instruct the inverter to reduce or increase battery charge or discharge accordingly. In other embodiments, the controllable asset may be diesel generator or the like, the controllable asset system 500A may comprise, for example, the diesel generator instead of the battery.

FIG. 2 is block diagram showing an exemplary embodiment of the operation platform that may be specifically configured in accordance with an example embodiment of the present invention. The platform device may comprise and/or be configured to leverage or otherwise leverage one or more of the following components to perform optimization and other analytics in both a pre-sales and operational context: a tariff library & billing engine 212, a historical customer data collection engine & repository 216; load forecasting engine 218; electricity market price data collection & repository 222; dispatch forecasting engine 220; customer model (representation of customer data on the operational platform, e.g., service account number, meter number(s), substation, etc.) 226; (7) Contract Library (e.g. host customer contract rules, utility contract rules) 228; and (8) co-optimization model 224.

The portfolio co-optimization model 224 may be configured to optimize (1) utility, system operator, or market-based dispatch and (2) customer bill savings, for example, to maximize or otherwise increase revenue. This Co-Optimization model can be modified to operate in each of a plurality of modes of operation in different contexts: (1) Portfolio Optimization in operational context which may be configured to generate optimal dispatch instructions for multiple battery units, based on scenario analysis of a coming time period (e.g., the coming hour), in consideration of whether or not an energy system is likely to require dispatch of energy in a firm load drop response. (2) Portfolio Optimization in a deterministic pre-sales analysis context which may be configured to analyze a set of multiple customer sites, and their respective load profiles and site restrictions to determine if project economics will enable any controllable asset, such as for example, a battery system, to be located at a given customer site, and further, the optimal battery system size for each site, or (3) Run in operations or in pre-sales with a "portfolio" of one single site, to provide pre-sales analysis of an individual customer load profile or in operations, generate schedule for that individual site alone. In some embodiments, this model may be configured to perform co-optimization across a plurality of sites, much like the Portfolio Optimization section described below. In some embodiments, this model may run on a periodic (e.g., daily, hourly, or the like) basis, and may send DCR schedules to the controllable asset systems each time it runs; and it may also receive external signals for fleet-wide dispatch of firm capacity, and allocate that dispatch signal optimally across a fleet of controllable asset systems, in light of other DCR activities at those sites, and available load to drop at each site if electricity export to the grid is disallowed, in order to meet the aggregated dispatch request while considering site-level restrictions.

The operational platform 300 may be cloud-based (e.g., hosted on a cloud-based virtual server). The operational platform 300 may facilitate communications as demonstrated in the diagram below. To communicate with the distributed fleet, the operational platform 300 may utilize REST API methods or distributed queuing system (e.g. publish/subscribe method) which the gateway devices may invoke at regular intervals (e.g., 1 minute), secured by mutual authentication mode transport layer security (e.g., TLS).

Site Level Infrastructure

FIG. 3 is block diagram showing an exemplary site level diagram that may be specifically configured in accordance with an example embodiment of the present invention. For example, where the customer does have on-site generation, the system provides meters at site-level (S), at renewable energy generation level (G), and at the battery inverter (B), such that S=L−G−B (i.e., the site load (S) is equal to the total load of the site (L) minus the generated renewable power (G) minus the battery power (B), where load (L) is a calculated value. The system may control battery use such that battery power is never exported. This is done by ensuring B<L (i.e., the supplied power from the battery is always less than the total Load of the site). Note that power from the on-site generation may be exported and, as such, when S is negative and L is zero, B is zero.

Apparatus

Regardless of the type of device that embodies any of gateway devices 400A-400Nv or platform device 300, any of gateway devices 400A-400N or platform device 300 may include or be associated with an apparatus 400 as shown in FIG. 4. In this regard, the apparatus may include or otherwise be in communication with a processor 402, a memory device 404, a communication interface 406 and a user interface 408. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 402 (and/or co-processors or any other processing circuitry assisting or otherwise associated with the processor) may be in communication with the memory device 404 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 400 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 400 may be embodied by any of gateway devices 400A-400Nv or platform device 300 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 402 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 402 may be configured to execute instructions stored in the memory device 404 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 408.

Meanwhile, the communication interface 406 may be any means such as a device or circuitry embodied in either hardware or a combination of hardware and software that is configured to receive and/or transmit data between the any of user devices 600, gateway devices 400A-400N, platform device 300, third-party repositories 200, or utility 100. In this regard, the communication interface 406 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 408 may be in communication with the processor 402, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 404 and/or the communication interface 406, such as via a bus.

Pre-Sales Analysis of Sites

The system may be configured to apply a portfolio optimization model for determining the battery configuration at a plurality of sites based on the site-level electrical use profiles, contract terms, and applicable tariffs for each site under consideration. That is, a particular site will have a particular electrical use profile (from which a load curve may be predicted), a particular contract under which the customer is engaged with one or more energy provider(s), and particular tariff rates, or other cost structures provided by the energy provider(s). The system may be configured to determine the battery configuration (e.g., size and/or type) and the available cost-savings and revenues. This process may also be used to inform utility contract proposals.

In a pre-sales context, the portfolio optimization model may be configured to run with a "portfolio" of one single site, to determine the optimal system size for a given site, in consideration of the individual site-level electrical use profile, contract terms, and applicable tariff(s) for that site.

General Operation

The operational platform predicts, for example, on a monthly basis, a site-level load curve and generates a schedule identifying a site-level load-plan, the site-level load plan indicating energy dispatch instructions optimizing use of the battery to maximize capacity or other product delivery to the energy provider and minimize customer energy costs based on relevant customer tariffs (e.g. time-of-use demand charges and energy rates). Each site-level optimized schedule may be generated in accordance with the predicted load curve, the particular utility-provider contract, and the applicable tariff data of the site. A site-level schedule is provided to a gateway device, and the gateway device provides real-time or near real-time instructions to the third-party provided local controller, which controls the inverter and DC combiner panel.

Site-Level Constraints

In each context that the system is being used (e.g. pre-sales analysis or operations), the system may be configured to optimally operate each site in accordance with multiple site constraints, such as a no-charge period (i.e., charging of the battery is prohibited during a particular window) and a non-export rule (i.e., battery power cannot be exported).

Where a customer has no on-site generation, the system may be configured to reduce battery use measured by, for example, a meter at the inverter as a site meter approaches 0 kW. As such, battery power is never exported. Where the customer does have on-site generation, the system provides meters at site-level, at renewable energy generation level, and at the inverter (B), such that $S=L-G-B$ (i.e., the site load (S) is equal to the total load of the site (L) minus the generated renewable power (G) minus the battery power (B), where load (L) is a calculated value. The system may control battery use such that battery power is never exported if such is a constraint. This is done by ensuring $B<L$ (i.e., the supplied power from the battery is always less than the total Load of the site). Note that power from the on-site generation may be exported and, as such, when S is negative and L is zero, B is zero. FIG. 3 shows this embodiment.

Multi-Site Portfolio Operation Model

The system may be configured such that each of the cloud-based platform and the on-site gateway device are configured to receive signals from the energy provider requesting energy dispatch. When dispatched by the energy provider through the cloud-based platform, the platform may determine through optimization how to dispatch the controllable assets within the portfolio of available sites or customer contracts (which may comprise a plurality of sites). The system may determine a "best fit" when determining a load amount and a site selection for instructing a discrete dispatch event, such that one or more on-site gateway devices will receive instructions to override the site-level schedule and increase battery usage, thereby further reducing grid-supplied electric consumption and reducing total distribution load of the energy provider. Further, these dispatch signals for each on-site energy storage unit will take into account the tariff considerations and site restrictions, such that energy storage control will update scheduled thresholds and charging parameters, in light of the expected battery energy capacity after the dispatch event. When dispatched by the energy provider through the gateway device, logic on the device ensures that dispatch instructions are compatible with (and secondary to) platform-based dispatch instructions.

The system may be configured to perform portfolio optimization, which comprises identifying the best sites to earn the highest performance score possible for each dispatch signal from the utility with the battery and load resources that the system has available in its portfolio.

It should be noted that the optimization model is generic in nature and may be able to handle multi-site portfolio optimization, while accommodating any combination of assets and market products (e.g. wholesale markets), as well as utility programs. Thus the approach is able to provide 'stacked services' to the distribution and transmission grids, resulting in multiple and concurrent revenue streams. By co-optimizing a portfolio of flexible loads, storage and distributed generation assets to provide such grid services, the AMS approach provides an economically sustainable business model, that will facilitate the integration of renewable generation and storage assets, resulting in greenhouse gases emissions, improved power quality and resiliency.

Processes

In an example embodiment of the present invention, a system, apparatus or computer program product may be provided to implement or execute a method, process, or algorithm for generating and subsequently providing a site-level schedule to a gateway apparatus for facilitating control of on-site energy asset usage and grid-supplied electric consumption.

In exemplary embodiments, the system, comprising the operational platform and the gateway device, may be configured to utilize, for example, historical meter and billing data, a tariff library, and market/weather data to perform site-level and, in some embodiments, portfolio-level optimization and subsequently generate site-level schedules. The site-level schedules may then be provided to the gateway devices for dictating on-site battery usage vs. grid-supplied electric consumption. The gateway device may be configured to receive the site-level schedule data from the operational platform and implement a load-shaving plan according to the schedule data by instructing the local controller to implement real-time or near real-time battery dispatch. FIG. 5 is a flowchart showing an exemplary method of operating an example apparatus in accordance with an embodiment of the present invention.

As shown in block 505 of FIG. 5, an apparatus, such as apparatus 20 embodied by the operational platform 300 and/or apparatus 400, may be configured to determine or otherwise calculate a site load curve. The apparatus embodied by operational platform 300 and/or apparatus 400 may therefore include means, such as the processor 402, the communication interface 406 or the like, for calculating a site load curve, for example, for each of one or more customers with energy assets within a given portfolio aggregation (e.g. market node or other aggregation). The site load curve may be indicative of a predicted site load of, for example, a host customer, at each of a plurality of periods of a day. In some embodiments, the site load curve may be determined as a function of and/or in consideration of other existing on-site generation resources (e.g. solar, wind, fuel cell, combustion generators). The determination or calculation of the site load curve may be made as a function of one or more of historical meter data, historical billing data, and/or market/weather data. In some embodiments, a predefined confidence interval may dictate DCR thresholds. Additionally or alternatively, calculations related to the probability of event may result in re-calculating optimal DCR thresholds.

As shown in block 510 of FIG. 5, an apparatus, such as apparatus 20 embodied by the operational platform 300 and/or apparatus 400, may be configured to perform portfolio-level optimization. The apparatus embodied by operational platform 300 and/or apparatus 400 may therefore include means, such as the processor 402, the communication interface 406 or the like, for performing portfolio-level optimization. The performance of the portfolio-level optimization may be made as a function of the site load curve and time-of-use type data (e.g., a tariff library). In some embodiments, the portfolio-level optimization may be made as a function of the site load curves and a tariff library, the portfolio-level optimization configured to segment the site load curves in accordance with tariff periods and other site-level restrictions on battery charging and discharging, and for each segment, calculate and output a power consumption maximum threshold. In particular, the portfolio-level optimization process may comprise segmenting the site load curve in accordance with tariff periods, and for each segment, calculating and outputting the power consumption maximum threshold. For example, FIG. 8 shows a graph illustrating the segmentation of the site load curve and the associated DCR threshold voltages.

As shown in block 515 of FIG. 5, an apparatus, such as apparatus 20 embodied by the operational platform 300 and/or apparatus 400, may be configured to generate a set of site-level schedules. The apparatus embodied by operational platform 300 and/or apparatus 400 may therefore include means, such as the processor 402, the communication interface 406 or the like, for generating a set of site-level schedules, as a function of the portfolio-level optimization and site restrictions described above, with the set of site-level schedules configured to be provided to a gateway apparatus for facilitating the use of on-site energy asset usage instead of grid-supplied electric consumption.

Once generated, the site-level schedule may be configured to be provided to a gateway apparatus. FIG. 7 illustrates an exemplary site-level schedule that may be generated in accordance with an example embodiment of the present invention.

As shown in block 520 of FIG. 5, an apparatus, such as apparatus 20 embodied by the operational platform 300 and/or apparatus 400, may be configured to provide the site-level schedule. The apparatus embodied by operational platform 300 and/or apparatus 400 may therefore include means, such as the processor 402, the communication interface 406 or the like, for providing the site-level schedule to a gateway apparatus for facilitating control of on-site energy asset usage and grid-supplied electric consumption.

In an example embodiment of the present invention, a system, apparatus or computer program product may be provided to implement or execute a method, process, or algorithm for facilitating control of on-site energy asset usage and grid-supplied electric consumption.

In an exemplary embodiment, the system, comprising the operational platform and the gateway device, may be configured to utilize the site-level schedule data and implement a load-shaving plan according to the site-level schedule data by instructing the local controller to implement real-time or near real-time battery dispatch. FIG. 6 is a flowchart showing an exemplary method of operating an example apparatus in accordance with an embodiment of the present invention.

As shown in block 605 of FIG. 6, an apparatus, such as apparatus 20 embodied by the gateway apparatus 400A-400N 300 and/or apparatus 400, may be configured to poll the operation platform for, receive, or otherwise access the site-level schedule. The apparatus embodied by the gateway apparatus 400A-400N 300 and/or apparatus 400 may therefore include means, such as the processor 402, the communication interface 406 or the like, for polling for, receiving, or accessing the site-level schedule.

As shown in block 610 of FIG. 6, an apparatus, such as apparatus 20 embodied by the gateway apparatus 400A-400N 300 and/or apparatus 400, may be configured to provide instructions facilitating real-time or near real-time on-site energy asset control. The apparatus embodied by the gateway apparatus 400A-400N 300 and/or apparatus 400 may therefore include means, such as the processor 402, the communication interface 406 or the like, for providing instructions facilitating real-time or near real-time on-site energy asset control. Exemplary instructions are provided below, which show various values for each of a plurality of categories. For example, the gateway apparatus may write to the battery registers for the upcoming event, a function and/or command status or mode, Max Power Target, Min Power Target, State of Charge Target, Max Charge Power and Max Discharge Power.

{"min_site_power_w": 0.0,
"dispatch_level": 0.0,
"schedule_details_id": 511,
"max_charge_power_w": 250000.0,
"max_site_power_w": 413000.0,
"soe_target_wh": 1650000.0,
"event_start_time": "2016-03-07T08:00:00+00:00",
"max_discharge_power_w": 250000.0,
"fk_schedule_id": 9}

The model is configured to consider any combination of arbitrary costs and maximize revenues across them. For example, during a segment in which a customer's tariff or rate reflects lowest costs, is below a pre-defined threshold or the like (e.g. in an off-peak period) and site-level restrictions permit charging, as shown in block 615 of FIG. 6, an apparatus, such as apparatus 20 embodied by the gateway apparatus 400A-400N 300 and/or apparatus 400, may be configured to cause the predicted site load to be satisfied via grid-supplied electric consumption and allow charging of the on-site energy storage system (e.g., a battery) to the extent that the predicted site load does not meet or surpass the threshold. The apparatus embodied by the gateway apparatus 400A-400N 300 and/or apparatus 400 may therefore include means, such as the processor 402, the communication interface 406 or the like, for causing the predicted site load to be satisfied via grid-supplied electric consumption and allowing charging of the battery to the extent that the predicted site load does not meet the threshold.

During a segment a customer's electric consumption is less than a pre-defined threshold and the site-level restrictions do not permit charging, as shown in block 620 of FIG. 6, an apparatus, such as apparatus 20 embodied by the gateway apparatus 400A-400N 300 and/or apparatus 400, may be configured to cause the predicted site load to be satisfied via grid-supplied electric consumption and disallow the charging of the on-site energy storage system. The apparatus embodied by the gateway apparatus 400A-400N 300 and/or apparatus 400 may therefore include means, such as the processor 402, the communication interface 406 or the like, for causing the predicted site load to be satisfied via grid-supplied electric consumption and dis-allowing the charging of the on-site energy storage system.

During a segment a customer's electric consumption is greater than a pre-defined threshold and the site-level restrictions do not permit charging, as shown in block 625 of FIG. 6, an apparatus, such as apparatus 20 embodied by the gateway apparatus 400A-400N 300 and/or apparatus 400, may be configured to cause the predicted site load to be satisfied via grid-supplied electric consumption up to an associated DCR threshold and cause any remaining portion of the predicted site load to be satisfied via the on-site energy assets and dis-allow charging of the battery. The apparatus embodied by the gateway apparatus 400A-400N 300 and/or apparatus 400 may therefore include means, such as the processor 402, the communication interface 406 or the like, for causing the predicted site load to be satisfied via grid-supplied electric consumption up to an associated DCR threshold and causing any remaining portion of the predicted site load to be satisfied via the on-site energy assets and dis-allowing charging of the battery.

During a segment in which a rate is within a pre-defined range (e.g., above a first threshold and, for example, below a second threshold, i.e., mid-peak) and site-level restrictions permit charging (e.g., a "no-charge" rule is not in effect), as shown in block 630 of FIG. 6, an apparatus, such as apparatus 20 embodied by the gateway apparatus 400A-400N 300 and/or apparatus 400, may be configured to cause the predicted site load to be satisfied via grid-supplied electric consumption up to the associated DCR threshold and allow charging of the on-site energy storage system to the extent that the predicted site load does not meet the threshold. The apparatus embodied by the gateway apparatus 400A-400N 300 and/or apparatus 400 may therefore include means, such as the processor 402, the communication interface 406 or the like, for causing the predicted site load to be satisfied via grid-supplied electric consumption up to the associated DCR threshold and allowing charging of the on-site energy storage system to the extent that the predicted site load does not meet the threshold.

During a segment in which a rate is within a pre-defined range (e.g., above a first threshold and, for example, below a second threshold, i.e., mid-peak) and site-level restrictions do not permit charging (e.g., a "no-charge" rule is in effect), as shown in block 635 of FIG. 6, an apparatus, such as apparatus 20 embodied by the gateway apparatus 400A-400N 300 and/or apparatus 400, may be configured to cause the predicted site load to be satisfied via grid-supplied electric consumption up to the associated DCR threshold, cause any remaining portion of the predicted site load to be satisfied via the on-site energy assets, and dis-allow charging of the on-site energy storage system. The apparatus embodied by the gateway apparatus 400A-400N 300 and/or apparatus 400 may therefore include means, such as the processor 402, the communication interface 406 or the like, for causing the predicted site load to be satisfied via grid-supplied electric consumption up to the associated DCR threshold, causing any remaining portion of the predicted site load to be satisfied via the on-site energy assets, and dis-allowing charging of the on-site energy storage system.

Single-Site Operation Model where a Customer has No on-Site Generation Allowed to Export A single-site operation model where the AMS system is configured to optimally operate each site in accordance with restraints that include a no-charge period (i.e., charging of the battery is prohibited during a particular window) and non-export rule (i.e., power from energy assets cannot be exported). Where a customer has no on-site generation, the system is configured to reduce energy asset electricity measured by, for example, a meter on the energy asset as a site meter approaches 0 kW. As such, electricity from the energy asset is never exported.

Single-Site Operation Model where a Customer does have on-Site Generation Allowed to Export A single-site operation model where the AMS system is configured to optimally operate each site in accordance with restraints that include a no-charge period (i.e., charging of the battery is prohibited during a particular window) and non-export rule (i.e., electricity generation from energy assets, including battery power, cannot be exported). Where the customer does have on-site generation, the system provides that no energy asset power is exported by (2) providing meters at site-level, renewable energy generation level, and at the inverter and represented by S=L−G−B, instructing reduction of battery use such that battery power is never exported. B<L always. Note that power from the on-site generation may be exported and as such, when S is negative and L is zero, B is zero.

Multi-Site Portfolio Operation Model

In an example embodiment of the present invention, a system, apparatus or computer program product may be provided to implement or execute a method, process, or algorithm for facilitating multi-site portfolio optimization by controlling each of a plurality of on-site energy assets and grid-supplied electric consumption.

In an exemplary embodiment, the system comprising the operational platform and a plurality of gateway devices, each located at a different site, may be configured to utilize, for example, historical meter and billing data, a tariff library, and market/weather data to perform site-level and, in some embodiments perform fleet-level optimization, for example, by determining which one or more of the plurality of gateway apparatus to instruct to perform on-site energy dispatch and at what times, thus reducing grid-supplied energy consumption.

FIG. 9 is a flowchart showing an exemplary method of operating an example apparatus in accordance with an embodiment of the present invention.

As shown in block 905 of FIG. 9, an apparatus, such as apparatus 20 embodied by the operational platform 300 and/or apparatus 400, may be configured to receive and/or access input data. Input data is described in great detail below. Once the input data is received, as shown in block 910 of FIG. 9, an apparatus, such as apparatus 20 embodied by the operational platform 300 and/or apparatus 400, may be configured to determine, as a function of the input data, a location of at least one of the grid-connected energy consumers at which to reduce grid-supplied energy consumption.

In addition to determining which location at which to reduce grid-supplied energy consumption, the amount of the reduction may be determined. As such, as shown in block 915 of FIG. 9, an apparatus, such as apparatus 20 embodied by the operational platform 300 and/or apparatus 400, may be configured to determine an amount of a reduction of grid-supplied energy consumption and, in some embodiments, further allocate the total reduction across the systems of each grid-connected energy consumer. Subsequent to determining where and by how much to reduce grid-supplied energy consumption, instructions may be generated and sent. As shown in block 920 of FIG. 9, an apparatus, such as apparatus 20 embodied by the operational platform 300 and/or apparatus 400, may be configured to transmit a signal to a corresponding gateway device located at the determined location, the signal comprising data indicative of instructions for performing on-site energy dispatch. In some embodiments, the instructions may be configured to override a previously supplied site-level schedule and, for example, increase battery usage.

In another exemplary embodiment, the system, comprising the operational platform and a plurality of gateway devices, each located at a different site, may be configured to utilize specific parameters to dynamically modify site-level schedules to perform portfolio optimization.

The dynamic modification of each of one or more site-level schedules may be made in accordance with particular parameters (e.g., adhering to an agreed-upon base-line cost and/or energy savings level while providing new instructions for controlling on-site energy asset usage and grid-supplied electric consumption. In some embodiments, the system may again utilize, for example, historical meter and billing data, a tariff library, and market/weather data to perform portfolio-level optimization and, in some embodiments, subsequently generate site-level schedules. As described above, the site-level schedules may be provided to the gateway devices for instructing on-site energy asset usage vs. grid-supplied electric consumption. The gateway device may be configured to receive the site-level schedule data from the operational platform and implement a load-shaving plan according to the schedule data by instructing, for example, the local controller to implement real-time or near real-time battery dispatch. FIG. 10 is a flowchart showing an exemplary method of operating an example apparatus in accordance with an embodiment of the present invention.

As shown in block 1005 of FIG. 10, an apparatus, such as apparatus 20 embodied by the operational platform 300 and/or apparatus 400, may be configured to receive and/or access input data. In some embodiments, input data may comprise one or more of the following:

| | |
|---|---|
| accounts | set of all service accounts in the portfolio |
| intervals | set of all time intervals for the month |
| no_charge_intervals | subset of intervals where battery cannot charge |
| peak_intervals | subset of intervals where peak DCR is in effect |
| mid_peak_intervals | subset of intervals where mid peak DCR is in effect |
| unit_capacity_kwh | (ex: 400) |
| max_unit_charge_rate | maximum rate at which a unit can charge (ex: 200) |
| max_unit_discharge_rate | maximum rate at which a unit can discharge (ex: 200) |
| charging_efficiency | (ex: 0.9) |
| discharging_efficiency | (ex: 0.95) |
| interval_length_hrs | 0.25 |
| project_life | Number of years to amortize install/system costs |
| APR | Interest rate for amortizing install/system costs |

In some embodiments, input data may comprise utility dispatch data. For example, utility dispatch data may include:

| | |
|---|---|
| annual_utility_rate_kw | utility rate for calculating revenue from utility |
| utility_dispatch_length_hrs | number of hours in each utility dispatch (ex: 4) |
| fixed_utility_commitment | utility commitment (kW) |
| utility_dispatches | set of indices for utility dispatches (ex: 1, 2, . . . , 20) |
| utility_intervals$_{d,h}$ | Subset of intervals for d ∈ utility_dispatches, hour h ∈ {1, . . . , utility_dispatch_length_hrs} |

In some embodiments, input data may comprise host customer demand charge management (DCM) data. For example, host customer DCM data may include:

| | |
|---|---|
| dcm_rate_kw | Demand charge for maximum demand |
| peak_dcm_rate_kw | Demand charge for max demand in peak intervals |
| mid_peak_dcm_rate_kw | Demand charge for max demand in mid-peak intervals |
| peak_cpp_dcm_discount_kw | Peak demand charge discount per kW above the capacity reservation level (CRL) (≥0) |
| mid_peak_cpp_dcm_discount_kw | Mid-peak demand charge discount per kW above the CRL (≥0). (0 if not take-or-pay CRL, or not summer month) |

In some embodiments, input data may comprise energy cost data. For example, energy cost data may include:

| | |
|---|---|
| cpp_intervals | Subset of intervals where critical peak pricing (CPP) is in effect |
| energy_price_kwh$_i$ | Energy price per kWh at interval i |
| cpp_kwh_rate | CPP energy price |
| highest_possible_crl | A value larger than any real CRL |

In some embodiments, input data may comprise bill savings data. For example, bill savings data may include:

| | |
|---|---|
| bill_savings_lb | The minimum % savings from the original bill which must be achieved, or cost will be incurred to make up the balance. |

-continued

| | |
|---|---|
| bill_savings_ub | The maximum % savings from the original bill for which to aim. (Higher is allowed, but the model will not seek savings above this bound) |

In some embodiments, input data may comprise account specific data. For example, account specific data may include:

| | |
|---|---|
| native_demand_kw$_{i,a}$ | demand for account a ∈ accounts at each time i ∈ intervals |
| fixed_battery_units$_a$ | Number of battery units for account a ∈ accounts |
| init_percentfull$_a$ | (ex: 0.25) |
| native_capacity_reservation_level$_a$ | CRL in effect before battery for account a ∈ accounts |
| post_battery_fixed_capacity_reservation_level$_a$ | CRL in effect after battery for account a ∈ accounts |

In some embodiments, input data may comprise native generation charges data. For example, native generation charges data may include:

| | |
|---|---|
| native_generation_dcm_cost$_a$ | The pre-optimization generation demand charge for account a ∈ accounts |
| native_generation_energy_cost$_a$ | The pre-optimization generation energy cost for account a ∈ accounts |

In some embodiments, input data may comprise Native delivery charges data. For example, Native delivery charges data may include:

| | |
|---|---|
| native_delivery_dcm_cost$_a$ | The pre-optimization delivery demand charge for account a ∈ accounts |
| native_delivery_energy_cost$_a$ | The pre-optimization delivery energy cost for account a ∈ accounts |

In some embodiments, input data may comprise already observed maximum demand data. For example, already observed maximum demand data may include:

| | |
|---|---|
| observed_max_demand$_a$ | The observed max demand so far this month (0 if day 1) for a ∈ accounts |
| observed_max_peak_demand$_a$ | The observed max peak demand this month (0 if day 1) for a ∈ accounts |
| observed_max_mid_peak_demand$_a$ | The observed max mid-peak demand this month (0 if day 1) for a ∈ accounts |

In some embodiments, input data may comprise direct access (DA) customer data or pricing data contracted by a customer with energy retailers in deregulated markets. For example, DA customer data may include:

| | |
|---|---|
| long_term_contract_price_kwh$_{i,a}$ | The long term contract $/kWh for interval i ∈ intervals, a ∈ accounts |
| long_term_contract_kw$_{i,a}$ | The long term contract kW for interval i ∈ intervals, a ∈ accounts |
| long_term_contract_cost$_a$ | The cost of the long term contract (for bill savings calculation) , a ∈ accounts |
| imbalance_price_per_kwh$_i$ | The imbalance market $/kWh for interval i ∈ intervals |

In some embodiments, input data may comprise generator or battery cost data. In some embodiments, installation costs, maintenance costs, and operational costs may also be considered. For example, battery cost data may include:

| | |
|---|---|
| install_cost_per_kwh$_a$ | System installation costs for npv calculation for a ∈ accounts |
| cycle_tiers$_a$ | Set of cycles/year tiers for initial and maintenance costs, for a ∈ accounts (ex: { 50, 100, 150, 200, 365 }) |
| initial_battery_cost_per_kwh$_{c,a}$ | Initial capacity cost per installed kWh if in tier c ∈ cycle_tiers, a ∈ accounts |

-continued

| | |
|---|---|
| battery_maint_cost_per_kwh$_{c,a}$ | Capacity maintenance cost/installed kWh if in tier c ∈ cycle_tiers, a ∈ accounts |
| incentive_per_w | incentive/subsidy for W not commited to utility dispatch (ex $1/W) |

In some embodiments, input data may comprise data regarding existing assets. For example, data regarding existing assets may include:

| | |
|---|---|
| existing_solar$_{i,a}$ | Existing solar kW in interval i, for i ∈ intervals, a ∈ accounts |
| existing_wind$_{i,a}$ | Existing wind kW in interval i, for i ∈ intervals, a ∈ accounts |
| existing_fuelcell$_{i,a}$ | Existing fuelcell kW in interval i, for i ∈ intervals, a ∈ accounts |
| existing_engine$_{i,a}$ | Existing engine kW in interval i, for i ∈ intervals, a ∈ accounts |

In some embodiments, input data may comprise solar data to simulate hypothetical solar installations. For example, solar data may include:

| | |
|---|---|
| solar_gen_per_kw$_{i,a}$ | The generation for 1 kW in interval i, for i ∈ intervals, a ∈ accounts |
| solar_system_cost_per_kw$_a$ | Solar system costs, for a ∈ accounts |
| solar_install_cost_per_kw$_a$ | Solar installation costs, for a ∈ accounts |
| solar_cost_per_kwh$_a$ | Solar cost per kwh, for a ∈ accounts |

In some embodiments, input data may comprise computed data. For example, computed data may include:

max_possible_cycles$_a$=max(c∈cycle_tiers$_a$)

native_bill$_a$=native_generation_dcm_cost$_a$+native_generation_energy_cost$_a$+native_delivery_dcm_cost$_a$+native_delivery_energy_cost$_a$ native_peak_max_demand$_a$=the maximum native demand in peak intervals,∀a∈accounts native_mid_peak_max_demand$_a$=the maximum native demand in mid-peak intervals, ∀a∈accounts As shown in block 1010 of FIG. 10, an apparatus, such as apparatus 20 embodied by the operational platform 300 and/or apparatus 400, may be configured to calculate variable data.

In some embodiments, variable data may comprise may include:

| | | |
|---|---|---|
| realized_demand$_{i,a}$ | $\forall$ i $\in$ intervals, a $\in$ accounts | $\geq$0 kW |
| battery_end_state$_{i,a}$ | $\forall$ i $\in$ intervals, a $\in$ accounts | $\geq$0 kW |
| battery_out$_{i,a}$ | $\forall$ i $\in$ intervals, a $\in$ accounts | $\geq$0 kW |
| battery_in$_{i,a}$ | $\forall$ i $\in$ intervals, a $\in$ accounts | $\geq$0 kW |
| solar$_{i,a}$ | $\forall$ i $\in$ intervals, a $\in$ accounts | $\geq$0 kW |
| dump$_{i,a}$ | $\forall$ i $\in$ intervals, a $\in$ accounts | $\geq$0 kW |
| solar_nameplate_kw$_a$ | $\forall$ a $\in$ accounts | $\geq$0 kW |
| capacity_reservation_level$_a$ | $\forall$ a $\in$ accounts | $\geq$0 kW |
| in_cycle_tier$_{c,a}$ | $\forall$ c $\in$ cycle_tiers, a $\in$ accounts | {0,1} |

In some embodiments, variable data may comprise utility dispatch variables. For example, utility dispatch variables may include one or more of the following:

| | |
|---|---|
| utility_credit_kw$_i$ | $\forall$ d $\in$ utility_dispatches, h $\in$ {1, . . . , utility_dispatch_length_hrs}, i $\in$ utility_intervals$_{d, h}$ $\geq$ 0 |
| utility_hourly_avg_kw$_{d,h}$ | $\forall$ d $\in$ utility_dispatches, h $\in$ {1, . . . , utility_dispatch_length_hrs} $\geq$ 0 |
| utility_reported_kw$_d$ | $\forall$ d $\in$ utility_dispatches $\geq$ 0 |
| utility_pct_met | {0,1} |
| utility_pct$_{q\_r}$ | {0,1} |
| utility_pct$_{p\_q}$ | {0,1} |
| utility_pct$_{o\_p}$ | {0,1} |
| y$_r$ | {0,1} |
| y$_{q\_r}$ | {0,1} |
| y$_{p\_q}$ | {0,1} |
| y$_{o\_p}$ | {0,1} |

In some embodiments, variable data may comprise energy cost variables. For example, energy cost variables may include:

| | | |
|---|---|---|
| above_crl_cpp_realized_demand$_{j,a}$ | $\forall$ j $\in$ cpp_intervals, a $\in$ accounts $\geq$ 0 | kW |
| max_above_crl_peak_realized_demand$_a$ | $\forall$ a $\in$ accounts $\geq$ 0 | kW |
| max_above_crl_mid_peak_realized_demand$_a$ | $\forall$ a $\in$ accounts $\geq$ 0 | kW |
| is_peak_max_above_crl$_a$ | $\forall$ a $\in$ accounts {0,1} | 1 if max above > 0 |
| is_mid_peak_max_above_crl$_a$ | $\forall$ a $\in$ accounts {0,1} | 1 if max above > 0 |
| max_peak_realized_demand$_a$ | $\forall$ a $\in$ accounts $\geq$ 0 | kW |
| max_mid_peak_realized_demand$_a$ | $\forall$ a $\in$ accounts $\geq$ 0 | kW |
| max_realized_demand$_a$ | $\forall$ a $\in$ accounts $\geq$ 0 | kW |
| bill_savings$_a$ | $\forall$ a $\in$ accounts $\geq$ 0 | $ |
| bill_savings_deficit$_a$ | $\forall$ a $\in$ accounts $\geq$ 0 | $ |

In some embodiments, variable data may comprise subsidy variables. For example, subsidy variables may include:

| | | |
|---|---|---|
| subsidy | $\geq$0 | $ |

As shown in block 1015 of FIG. 10, an apparatus, such as apparatus 20 embodied by the operational platform 300 and/or apparatus 400, may be configured to perform portfolio optimization by applying models and, in some embodiments, adhering to specific constraints.

An exemplary model is shown below. While the model shown below may be a monthly model, one of ordinary skill would appreciate, the models may be utilized for any time period (e.g., yearly, daily, or the like).

That is, the model may be configured to maximize:

12*(total_bill_savings+utility_revenue−solar_energy_cost)−amortized_development_cost Where:

total_bill_savings = $\Sigma_{a \in accounts}$ (bill_savings$_a$ − bill_savings_deficit$_a$)
utility_revenue = ((1.05 * y$_r$) + utility_pct$_{q\_r}$ + (0.5 * utility_pct$_{p\_q}$) + utility_pct$_{o\_p}$ − (0.6 * y$_{o\_p}$)) )
  * (annual_utility_rate_kw /12) * fixed_utility_commitment)
solar_energy_cost = $\Sigma_{i \in intervals}$ $\Sigma_{a \in accounts}$ (solar$_{i,a}$ * interval_length_hrs * solar_cost_per_kwh)
Amortized cost: A = P*[(r(1+r)^n)/(1+r)^n − 1)]
amortized_development_cost = net_development_cost * (APR * (1+ APR)^project_life/((1+ APR)^project_life − 1)
net_development_cost         = battery_development_cost − subsidy + solar_development_cost
battery_development_cost = $\Sigma_{a \in accounts}$ battery_development_cost$_a$
battery_development_cost$_a$ =
  (fixed_battery_units$_a$ * unit_capacity_kwh) * (install_cost_per_kwh$_a$ + battery_install_maint_cost$_a$)
    $\forall$ a $\in$ accounts
battery_install_maint_cost$_a$ =
  $\Sigma_{c \in cycle\_tiers_a}$ ((initial_battery_cost_per_kwh$_{c,a}$ + battery_maint_cost_per_kwh$_{c,a}$) * in_cycle_tier$_{c,a}$)
    $\forall$ a $\in$ accounts $$\text{solar\_development\_cost} =$$
$$\Sigma_{a \in accounts} (\text{solar\_nameplate\_kw}_a * (\text{solar\_system\_cost\_per\_kw}_a + \text{solar\_install\_cost\_per\_kw}_a))$$

In some embodiments, the models described above may be subject to particular constraints. For example, the models may be subject to bill savings constraints.

For example, the model may set a lower bound on the bill savings. If the bound is not met by actual savings, the deficit variable will take the value of the shortfall.

$$\text{bill\_savings}_a \geq \text{native\_bill}_a * \text{bill\_savings}\_lb + \text{bill\_savings\_deficit}_a$$

In some embodiments, the model may be configured to cap the bill savings at the upper bound and the actual savings, so it will equal the minimum:

$$\text{bill\_savings}_a \leq \text{native\_bill}_a * \text{bill\_savings}\_ub$$

$$\text{bill\_savings}_a \leq \text{generation\_}dcm\text{\_savings}_a + \text{delivery\_}dcm\text{\_savings}_a + \text{generation\_energy\_cost\_savings}_a + \text{delivery\_energy\_cost\_savings}_a$$

Where, for example, only include applicable sections for accounts, as described below.

Generation DCM Savings:

$$\text{generation\_dcm\_savings}_a =$$
$$\text{native\_generation\_dcm\_cost}_a - (\text{realized\_base\_generation\_dcm\_cost}_a -$$
$$\text{realized\_peak\_generation\_dcm\_cost}_a - \text{realized\_mid\_peak\_generation\_dcm\_cost}_a$$
$$\forall \, a \in accounts$$

$$\text{realized\_base\_generation\_dcm\_cost}_a =$$
$$\text{max\_realized\_demand}_a * \text{generation\_dcm\_rate\_kw} \qquad \forall \, a \in accounts$$

$$\text{realized\_mid\_peak\_generation\_dcm\_cost}_a =$$
$$\text{max\_mid\_peak\_realized\_demand}_a * \text{generation\_monthly\_mid\_peak\_dcm\_rate\_kw}$$
$$\forall \, a \in accounts$$

$$\text{realized\_peak\_generation\_dcm\_cost}_a =$$
$$\text{max\_peak\_realized\_demand}_a * \text{generation\_peak\_dcm\_rate\_kw}$$
$$\forall \, a \in accounts$$

Delivery DCM Savings:

$$\text{delivery\_dcm\_savings}_a =$$
$$\text{native\_delivery\_dcm\_cost}_a - \text{realized\_base\_delivery\_dcm\_cost}_a$$
$$- \text{realized\_peak\_delivery\_dcm\_cost}_a - \text{realized\_mid\_peak\_delivery\_dcm\_cost}_a$$
$$+ \text{realized\_cpp\_dcm\_peak\_discount}_a + \text{realized\_cpp\_dcm\_mid\_peak\_discount}_a$$

$$\text{realized\_base\_delivery\_dcm\_cost}_a =$$
$$\text{max\_realized\_demand}_a * \text{delivery\_dcm\_rate\_kw} \qquad \forall \, a \in accounts$$

$$\text{realized\_peak\_delivery\_dcm\_cost}_a =$$
$$\text{max\_peak\_realized\_demand}_a * \text{delivery\_peak\_dcm\_rate\_kw}$$
$$\forall \, a \in accounts$$

$$\text{realized\_mid\_peak\_delivery\_dcm\_cost}_a =$$
$$\text{max\_mid\_peak\_realized\_demand}_a * \text{delivery\_monthly\_mid\_peak\_dcm\_rate\_kw}$$
$$\forall \, a \in accounts$$

$$\text{realized\_cpp\_dcm\_peak\_discount}_a =$$
$$\text{max\_above\_crl\_peak\_realized\_demand}_a * \text{peak\_cpp\_dcm\_discount\_kw}$$
$$\forall \, a \in accounts$$

$$\text{realized\_cpp\_dcm\_mid\_peak\_discount}_a =$$
$$\text{max\_above\_crl\_mid\_peak\_realized\_demand}_a * \text{mid\_peak\_cpp\_dcm\_discount\_kw}$$
$$\forall \, a \in accounts$$

Generation: Energy Savings:

$$\text{generation\_energy\_cost\_savings}_a =$$
$$\text{native\_generation\_energy\_cost}_a - \text{long\_term\_contract\_cost}_a - \text{imbalance\_cost}$$
$$\forall \, a \in accounts$$

$$\text{imbalance\_cost}_a =$$
$$\Sigma_{i \in intervals} (\text{realized\_demand}_{i,a} - \text{long\_term\_contract\_kw}_{i,a})$$
$$* \text{imbalance\_price\_per\_kwh}_i \qquad * \text{interval\_length\_hrs}$$
$$\forall \, a \in accounts$$

Delivery: Energy Savings $$\text{delivery\_energy\_cost\_savings}_a =$$
$$\text{native\_delivery\_energy\_cost}_a - \text{energy\_cost}_a - \text{energy\_cost\_adjust}_a \forall \ a \in \text{accounts}$$
$$\text{energy\_cost}_a = \Sigma_{i \ \in intervals} \ \text{realized\_demand}_{i,a} * \text{interval\_length\_hrs} * \text{energy\_price\_kwh}_i$$
$$\forall \ a \in \text{accounts}$$
$$\text{energy\_cost\_adjust}_a =$$
$$\Sigma_{i \ \in cpp\_intervals} \ (\text{above\_crl\_cpp\_realized\_demand}_{i,a} * \text{interval\_length\_hrs}$$
$$* \ (\text{cpp\_kwh\_rate} - \text{energy\_price\_kwh}_i))$$
$$\forall \ a \in \text{accounts}$$

In some embodiments, the system may be configured to identify monthly maximum realized demand overall, in peak, and in mid-peak:

$$\text{max\_realized\_demand}_a \geq \text{realized\_demand}_{i,a} \quad \forall \ i \in \text{intervals}, a \in \text{accounts}$$
$$\text{max\_peak\_realized\_demand}_a \geq \text{realized\_demand}_{i,a} \quad \forall \ i \in \text{peak\_intervals}, a \in \text{accounts}$$
$$\text{max\_mid\_peak\_realized\_demand}_a \geq \text{realized\_demand}_{i,a} \ \forall \ i \in \text{mid\_peak\_intervals}, a \in \text{accounts}$$

In some embodiments, the system may be configured to set the lower bounds to the observed values:

$$\text{max\_realized\_demand}_a \geq \text{observed\_max\_demand}_a \quad \forall \ i \in \text{intervals}, a \in \text{accounts}$$
$$\text{max\_peak\_realized\_demand}_a \geq \text{observed\_max\_peak\_demand}_a \quad \forall \ i \in \text{peak\_intervals}, a \in \text{accounts}$$
$$\text{max\_mid\_peak\_realized\_demand}_a \geq \text{observed\_max\_mid\_peak\_demand}_a \quad \forall \ i \in \text{mid\_peak\_intervals}, a \in \text{accounts}$$

In some embodiments, the system may be configured to, for example, for take-or-pay months, set alternate lower bound for maximums to the CRL:

$$\text{max\_realized\_demand}_a \geq \text{capacity\_reservation\_level}_a \quad \forall \ a \in \text{accounts}$$
$$\text{max\_peak\_realized\_demand}_a \geq \text{capacity\_reservation\_level}_a \quad \forall \ a \in \text{accounts}$$
$$\text{max\_mid\_peak\_realized\_demand}_a \geq \text{capacity\_reservation\_level}_a \quad \forall \ a \in \text{accounts}$$

In some embodiments, the system may be configured to perform above CRL calculations.

For example, if the realized demand is above the CRL in a cpp interval, "above_crl_cpp_realized_demand$_j$" will equal the portion that is above it. Otherwise, it will equal 0.

$$\text{above\_crl\_cpp\_realized\_demand}_{j,a} \geq \text{realized\_demand}_{j,a} - \text{capacity\_reservation\_level}_a \quad \forall \ j \in \text{cpp\_intervals}, \forall \ a \in \text{accounts}$$

In some embodiments, the system may be configured to perform peak calculation.

$$\text{max\_above\_crl\_peak\_realized\_demand}_a \geq \text{max\_peak\_realized\_demand}_a - \text{capacity\_reservation\_level}_a \quad \forall \ a \in \text{accounts}$$
$$\text{max\_above\_crl\_peak\_realized\_demand}_a \leq \text{max\_peak\_realized\_demand}_a - \text{capacity\_reservation\_level}_a + \text{highest\_possible\_crl} * (1 - \text{is\_peak\_max\_above\_crl}_a) \quad \forall \ a \in \text{accounts}$$
$$\text{max\_above\_crl\_peak\_realized\_demand}_a \leq \text{native\_peak\_max\_demand}_a * \text{is\_peak\_max\_above\_crl}_a \quad \forall \ a \in \text{accounts}$$

In some embodiments, the system may be configured to perform mid-peak calculations.

$$\text{max\_above\_crl\_mid\_peak\_realized\_demand}_a \geq \text{max\_mid\_peak\_realized\_demand}_a - \text{capacity\_reservation\_level}_a \quad \forall \ a \in \text{accounts}$$
$$\text{max\_above\_crl\_mid\_peak\_realized\_demand}_a \leq \text{max\_mid\_peak\_realized\_demand}_a - \text{capacity\_reservation\_level}_a + \text{highest\_possible\_crl} * (1 - \text{is\_mid\_peak\_max\_above\_crl}_a) \quad \forall \ a \in \text{accounts}$$
$$\text{max\_above\_crl\_mid\_peak\_realized\_demand}_a \leq \text{native\_mid\_peak\_max\_demand}_a * \text{is\_mid\_peak\_max\_above\_crl}_a \ \forall \ a \in \text{accounts}$$

In some embodiments, the models described above may be subject to particular constraints. For example, the models may be subject to utility constraints.

In some embodiments, the system may be configured to capture the kW that can be counted for utility credit.

$$\text{utility\_credit\_kw}_i \leq \Sigma_{a \in accounts} \ \text{fixed\_battery\_units}_a * \text{max\_unit\_discharge\_rate} \ \forall d \in \text{utility\_dispatches}, h \in \{1, \ldots, \text{utility\_dispatch\_length\_hrs}\}, i \in \text{utility\_intervals}_{d,h}$$

$$\text{utility\_credit\_kw}_i \leq \Sigma_{a \in accounts} \ \text{native\_demand\_kw}_{i,a} - \text{realized\_demand}_{i,a} \ \forall d \in \text{utility\_dispatches}, h \in \{1, \ldots, \text{utility\_dispatch\_length\_hrs}\}, i \in \text{utility\_intervals}_{d,h}$$

In some embodiments, the system may be configured to identify the utility credit for this hour, without allowing any fluctuation.

$$\text{utility\_hourly\_avg\_kw}_{d,h,s} = \text{utility\_credit\_kw}_{i,s}$$

$$\forall s \in \text{scenarios}, d \in \text{utility\_dispatches}_s, h \in \{1, \ldots, \text{utility\_dispatch\_length\_hrs}\}, i \in \text{utility\_intervals}_{d,h,s}$$

In some embodiments, the system may be configured to identify the minimum hour for each dispatch.

$$\text{utility\_reported\_kw}_d \leq \text{utility\_hourly\_avg\_kw}_{d,h} \forall d \in \text{utility\_dispatches}, h \in \{1, \ldots, \text{utility\_dispatch\_length\_hrs}\}$$

In some embodiments, the system may be configured to compute the utility percent met and determine utility payment or penalty due:

$$\text{utility\_pct\_met} = \Sigma_{d \in \text{utility\_dispatches}} \text{utility\_reported\_kw}_d / (\text{fixed\_utility\_commitment} * |\text{utility\_dispatches}|)$$

Exactly one of these indicator variables must be on:

$$y_r + y_{q\_r} + y_{p\_q} + y_{0\_p} = 1$$

Turn off the indicators above the percentage met. The objective function will ensure that the highest possible one turns on.

$$\text{utility\_pct\_met} \geq 1.05 * y_r$$

$$\text{utility\_pct\_met} \geq 0.75 * (y_r + y_{q\_r})$$

$$\text{utility\_pct\_met} \geq 0.60 * (y_r + y_{q\_r} + y_{p\_q})$$

Force the utility_pct variables to zero if their indicator is not on, otherwise the objective will drive them up.

$$\text{utility\_pct}_{q\_r} \leq 1.05 * y_{q\_r}$$

$$\text{utility\_pct}_{p\_q} \leq 0.75 * y_{p\_q}$$

$$\text{utility\_pct}_{0\_p} \leq 0.60 * y_{0\_p}$$

Cap these monthly utility_pct variables at the actual monthly utility % met.

$$\text{utility\_pct}_{q\_r} \leq \text{utility\_pct\_met}$$

$$\text{utility\_pct}_{p\_q} \leq \text{utility\_pct\_met}$$

$$\text{utility\_pct}_{0\_p} \leq \text{utility\_pct\_met}$$

In some embodiments, the system may be configured to perform a battery cost calculation.

In some embodiments, subsidy cannot exceed the non-utility contracted kWs multiplied by the subsidy per kW.

$$\text{subsidy} \leq (\Sigma_{a \in \text{accounts}} (\text{fixed\_battery\_units}_a) * \text{max\_unit\_discharge\_rate} - \text{fixed\_utility\_commitment}) * \text{subsidy\_per\_w} * 1000$$

In some embodiments, the system may be configured to ensure the system is in exactly one tier to comply with system warranties.

| | |
|---|---|
| $\Sigma c \in \text{cycle\_tiers}_a \text{ in\_cycle\_tier}_{c,a} = 1$ | $\forall a \in \text{accounts}$ |

In some embodiments, the system may be configured to identify which tier we are in. The left hand side is the actual number of cycles. One of the tier identifiers must turn on if the number of cycles exceeds the tier. This also ensures that the maximum allowable cycles is not exceeded according to energy asset warranty terms.

| | |
|---|---|
| $\Sigma_{i \in \text{intervals}} \text{battery\_in}_{i,a} / (\text{fixed\_battery\_units}_a * \text{unit\_capacity\_kwh}) * 12 \leq c + (\text{max\_possible\_cycles} - c) * \Sigma_{c' \in \{\text{cycle\_tiers}_a \mid c' > c\}} \text{in\_cycle\_tier}_{c',a}$ | $\forall a \in \text{cycle\_tiers}, a \in \text{accounts}$ |

In some embodiments, the models described above may be subject to particular constraints. For example, the models may be subject to miscellaneous constraints.

In some embodiments, the system may be configured to capture the realized demand.

$$\text{realized\_demand}_{i,a} = \text{native\_demand\_kw}_{i,a} - \text{battery\_out}_{i,a} - \text{solar}_{i,a} - \text{existing\_solar}_{i,a} - \text{existing\_wind}_{i,a} - \text{existing\_fuelcell}_{i,a} - \text{existing\_engine}_{i,a} + \text{battery\_in}_{i,a} + \text{dump}_{i,a} \forall i \in \text{intervals}, a \in \text{accounts}$$

In some embodiments, the system may be configured to link solar nameplate and curve to interval variables.

| | |
|---|---|
| $\text{solar}_{i,a} = \text{solar\_nameplate\_kw}_a * \text{solar\_gen\_per\_kw}_{i,a}$ | $\forall i \in \text{intervals}, a \in \text{accounts}$ |

In some embodiments, the system may be configured to prevent charging during no-charge intervals, except from allowable assets listed in the right hand side.

| | |
|---|---|
| $\text{battery\_in}_{i,a} \leq \text{solar}_{i,a} + \text{existing\_solar}_{i,a} + \text{existing\_wind}_{i,a} + \text{existing\_fuelcell}_{i,a} + \text{existing\_engine}_{i,a}$ | $\forall i \in \text{no\_charge\_intervals}, a \in \text{accounts}$ |

In some embodiments, the system may be configured to prevent battery from charging (discharging) faster than maximum charge (discharge) rate.

| | |
|---|---|
| $\text{battery\_in}_{i,a} \leq \text{fixed\_battery\_units}_a * \text{max\_unit\_charge\_rate}$ | $\forall i \in \text{intervals}, a \in \text{accounts}$ |
| $\text{battery\_out}_{i,a} \leq \text{fixed\_battery\_units}_a * \text{max\_unit\_discharge\_rate}$ | $\forall i \in \text{intervals}, a \in \text{accounts}$ |

In some embodiments, the system may be configured to prevent export onto the grid.

$$\text{battery\_out}_{i,a} \leq \text{native\_demand\_kw}_{i,a} \forall i \in \text{intervals}, a \in \text{accounts}$$

In some embodiments, the system may be configured to prevent battery state from exceeding battery capacity.

$$\text{battery\_end\_state}_{i,a} \leq \text{fixed\_battery\_units} * \text{unit\_capacity\_kwh} \forall i \in \text{intervals}, a \in \text{accounts}$$

In some embodiments, the system may be configured to define relationship between battery output and battery end_states.

| | |
|---|---|
| $\text{battery\_end\_state}_{0,a} = \text{fixed\_battery\_units}_a * \text{unit\_capacity\_kwh} * \text{init\_percent\_full}_a + \text{interval\_length\_hrs} * ((\text{battery\_in}_{0,a} * \text{charging\_efficiency}) - (\text{battery\_out}_{0,a} / \text{discharging\_efficiency}))$ | $\forall a \in \text{accounts}$ |
| $\text{battery\_end\_state}_{i,a} = \text{battery\_end\_state}_{i-1,a} + \text{interval\_length\_hrs} * ((\text{battery\_in}_{i,a} * \text{charging\_efficiency}) - (\text{battery\_out}_{i,a} / \text{discharging\_efficiency}))$ | $\forall i \in \{1, 2, \ldots, |\text{intervals}| - 1\}, a \in \text{accounts}$ |

In some embodiments, the system may be configured to set final battery state equal to initial battery state.

| | |
|---|---|
| $\text{battery\_end\_state}_{|\text{intervals}|-1,a} = \text{fixed\_battery\_units}_a * \text{unit\_capacity\_kwh} * \text{init\_percent\_full}_a$ | $\forall a \in \text{accounts}$ |

In some embodiments, the system may be configured to, optionally, hold battery_units or CRL constant.

$$\text{capacity\_reservation\_level}_a = \text{post\_battery\_fixed\_capacity\_reservation\_level}_a \quad \forall\, a \in \text{accounts}$$

In some embodiments, the system may be configured to run Model, for example, monthly, for each potential utility commitment and number of battery units per account.

As shown in block 1020 of FIG. 10, an apparatus, such as apparatus 20 embodied by the operational platform 300 and/or apparatus 400, may be configured to provide the site-level schedules to each of the plurality of affected gateway apparatuses for facilitating control of on-site energy asset usage and grid-supplied electric consumption.

FIG. 11 shows a diagram illustrating a specific embodiment of the multi-site portfolio optimization. The system may be configured to perform site-level optimization on each of a plurality of sites. That is, for example, on an hourly (or more frequent) basis, a portfolio optimization algorithm may run, generating optimal dispatch instructions and sending DCR schedules to controllable asset systems each time it runs. The algorithm may utilize forecast data for each site, and expected asset availability based on the forecast, site outage data, reflecting most recent status information from gateway components, as well as a Local Controller/Inverter issues, current and projected asset capacity, contract and installation data, reflecting contract/territory combinations, Gateway ID, and installed capacity, load forecast data, historical interval data (15-minute), operational site load data (1-minute) and output re-solved sets of dispatch instructions to achieve maximum dispatch across each of the following contract/territory combinations. This will ensure that the system is prepared to meet the maximum dispatch request from, for example, the utility system/company, with up-to-the hour data for a given day. This part of the process could be conceptualized as the "aggregation methodology."

The system may then receive a dispatch signal from the utility system. For example, through private tunnel on public internet, to connect to the utility system, the operational platform may receive a signal for event dispatch. In some embodiments, under contract, events may be dispatched as described above, for example, up to the maximum amount of capacity required for each respective contract. In other embodiments, the event signals may include wholesale market geographical region, load aggregation point, or zone, composed of certain transmission substations, etc., Contract ID, MW, Start Time, and Duration. Upon reception of a dispatch signal, the system may then have, for example, a pre-defined amount of time (e.g., 20 minutes) from the point of utility signal to achieve full battery response.

Subsequent to reception of the dispatch signal, the system may then re-run the portfolio optimization process described above. The system may then be configured to write to battery schedules. That is, results from the event processing may cause the system to update the schedule information for the relevant units to be dispatched.

At each site, the system may cause a gateway read, for example, every 0.5-5 minutes. In particular, each gateway apparatus in the field may be caused to poll the cloud platform to pull, or otherwise receive updated battery schedules over a RESTful API, or other secure transfer mechanisms including publish/subscribe methods. These gateways may be connected to the internet through a 4G/LTE cellular modem in the gateway apparatus. The gateway apparatus may store the full schedule locally, with updated dispatch instructions for the event period. At the start time of a given schedule period or event, the gateway apparatus may write to the energy asset controller for the upcoming event.

FIGS. 5, 6, 9, and 10 show flowcharts of the exemplary operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 406 of an apparatus employing an embodiment of the present invention and executed by a processor 404 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 5, 6, 9, and 10 when executed, convert a computer or processing circuitry into a particular machine configured to perform an example embodiment of the present invention. Accordingly, the operations of FIGS. 5, 6, 9, and 10 define an algorithm for configuring a computer or processing to perform an example embodiment. In some cases, a general purpose computer may be provided with an instance of the processor which performs the algorithms of FIGS. 5, 6, 9, and 10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 5, 6, 9, and 10. It should be appreciated that each of the modifications, optional additions or amplifications below may be included with the operations above either alone or in combination with any others among the features described herein.

Skid-Mounted Energy Asset System

In an embodiment of the present invention, the energy asset system described above may skid-mounted, for example, at a customer site, which allows for rapid installation, and when needed, the ability to relocate equipment. FIG. 12 illustrates a diagram of a skid-mounted energy asset system that may be provided in accordance with some embodiments of the present invention. In particular, embodiments of the present invention may provide a skidded energy asset system (e.g., energy storage systems, diesel generators, gas turbines, or the like) comprising power electronics and communications. The skidded energy asset system may include communications equipment, as described above, that allow for remote monitoring and dispatching, open architecture where all components are packaged to withstand the elements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising: a platform apparatus; and an on-site gateway apparatus,
   the platform apparatus comprising at least one processor and at least one memory including computer program code, the at least one memory and the computer program code configured to, with the processor, cause the apparatus to:
   calculate site load curves indicating predicted site load of a customer at each of a plurality of periods of a day as a function of one or more of historical meter and billing data, in consideration of other existing on-site generation resources, and market or weather data, for each of one or more customers with on-site energy assets within a given portfolio aggregation;
   perform portfolio-level optimization as a function of the site load curves and a tariff library, the portfolio-level optimization configured to segment the site load curves in accordance with tariff periods and other site-level restrictions, and for each segment, calculate and output a power consumption maximum threshold;
   generate a set of site-level schedules, as a function of the portfolio-level optimization and one or more site restrictions, the set of site-level schedules configured to be provided to a gateway apparatus for facilitating the use of the on-site energy assets instead of grid-supplied electric consumption; and
   the gateway apparatus comprising at least one processor and at least one memory including computer program code, the at least one memory and the computer program code configured to, with the processor, cause the apparatus to:
   receive the site-level schedule from the platform device and store that site-level schedule locally;
   at a start time of a given segment, provide instructions to facilitate real-time or near real-time on-site asset control.

2. The system according to claim 1, wherein the on-site energy assets comprise energy storage resources and the site-level restrictions comprise instructions on battery charging and discharging.

3. The system according to claim 2, wherein the computer program code configured to facilitate the on-site asset control, further comprises computer program code configured to, with the processor, cause the apparatus to:
   during a segment in which a customer's tariff or rate is less than a pre-defined threshold and site-level restrictions permit charging, cause the predicted site load to be satisfied via grid-supplied electric consumption and allowing charging of the energy storage resources to the extent that the predicted site load does not meet the scheduled maximum threshold.

4. The system according to claim 2, wherein the computer program code configured to facilitate the on-site asset control, further comprises computer program code configured to, with the processor, cause the apparatus to:
   during a segment in which a customer's tariff or rate is less than a pre-defined threshold and site-level restrictions do not permit charging, cause the predicted site load to be satisfied via grid-supplied electric consumption and dis-allowing charging of the energy storage resources.

5. The system according to claim 2, wherein the computer program code configured to facilitate the on-site asset control, further comprises computer program code configured to, with the processor, cause the apparatus to:
   during a segment a customer's tariff or rate is greater than a pre-defined threshold and the site-level restrictions do not permit charging, cause the predicted site load to be satisfied via grid-supplied electric consumption up to a scheduled maximum threshold and causing any remaining portion of the predicted site load to be satisfied via electricity generation of the on-site energy asset and preventing charging of the energy storage resources.

6. The system according to claim 2, wherein the computer program code configured to facilitate the on-site asset control, further comprises computer program code configured to, with the processor, cause the apparatus to:
   prevent net export to the grid caused by electricity generation of the on-site energy asset, should that site restriction exist from utility, interconnection, or other regulations and requirements.

7. The system according to claim 2, wherein the energy storage resources comprise battery systems.

8. The system according to claim 1, wherein the computer program code configured to facilitate the on-site asset control, further comprises computer program code configured to, with the processor, cause the apparatus to:
   prevent net export to the grid caused by user of the on-site energy assets, should that site restriction exist from utility, interconnection, or other regulations and requirements.

9. A computer program product comprising at least one non-transitory computer-readable storage medium having computer-executable program code instructions stored therein, the computer-executable program code instructions comprising program code instructions for:

calculating site load curves indicating predicted site load of a customer at each of a plurality of periods of a day as a function of one or more historical meter and billing data, in consideration of other existing on-site generation resources, and market or weather data, for each of one or more customers with on-site energy assets within a given portfolio aggregation;

performing portfolio-level optimization as a function of the site load curves and a tariff library, the portfolio-level optimization configured to segment the site load curves in accordance with tariff periods and other site-level restrictions, and for each segment, calculate and output a power consumption maximum threshold;

generating a set of site-level schedules, as a function of the portfolio-level optimization and one or more site restrictions, the set of site-level schedules configured to be provided to a gateway apparatus for facilitating the use of on-site energy assets instead of grid-supplied electric consumption;

transmitting the site-level schedule to a gateway device; and causing, at a start time of a given segment, real-time or near real-time on-site asset control.

10. The computer program product according to claim 9, wherein the on-site energy assets comprise energy storage resources and the site-level restrictions comprise instructions on battery charging and discharging.

11. The computer program product according to claim 10, wherein the computer program code configured to facilitate the on-site asset control, further comprise program code instructions for:

during a segment in which a customer's tariff or rate is less than a pre-defined threshold and site-level restrictions permit charging, causing the predicted site load to be satisfied via grid-supplied electric consumption and allowing charging of the energy storage resources to the extent that the predicted site load does not meet the scheduled maximum threshold.

12. The computer program product according to claim 10, wherein the computer program code configured to facilitate the on-site asset control, further comprise program code instructions for:

during a segment in which a customer's tariff or rate is less than a pre-defined threshold and site-level restrictions do not permit charging, causing the predicted site load to be satisfied via grid-supplied electric consumption and dis-allowing charging of the energy storage resources.

13. The computer program product according to claim 10, wherein the computer program code configured to facilitate the on-site asset control, further comprise program code instructions for:

during a segment a customer's tariff or rate is greater than a pre-defined threshold and the site-level restrictions do not permit charging, causing the predicted site load to be satisfied via grid-supplied electric consumption up to a scheduled maximum threshold and causing any remaining portion of the predicted site load to be satisfied via electricity generation of the on-site energy asset and preventing charging of the energy storage resources.

14. The computer program product according to claim 10, wherein the computer program code configured to facilitate the on-site asset control, further comprise program code instructions for:

preventing net export to the grid caused by electricity generation of the on-site energy asset, should that site restriction exist from utility, interconnection, or other regulations and requirements.

15. The computer program product according to claim 10, wherein the energy storage resources comprise battery systems.

16. The computer program product according to claim 9, wherein the computer program code configured to facilitate the on-site asset control, further comprise program code instructions for:

preventing net export to the grid caused by user of the on-site energy assets, should that site restriction exist from utility, interconnection, or other regulations and requirements.

17. A system configured to perform fleet-level management for reducing grid-supplied energy consumption with a firm capacity reduction, the system comprising:

a platform apparatus and a plurality of gateway apparatus, the plurality of gateway apparatus comprising at least a first gateway apparatus located at a first location, the first location being on-site of a grid-connected energy consumer and the second gateway apparatus located at a second location, the second location being on a different site of the grid-connected energy consumer or a different grid-connected energy consumer, each of the plurality of gateway apparatus configured to control an on-site energy asset, comprising at least an energy asset device, to control use of on-site energy instead of grid-supplied energy consumption;

the platform apparatus comprising at least one processor and at least one memory including computer program code, the at least one memory and the computer program code configured to, with the processor, cause the apparatus to:

receive or access input data;

determine, as a function of the input data, a location of each grid-connected energy consumers at which to reduce grid-supplied energy consumption;

determine an amount of a reduction of grid-supplied energy consumption, and further allocate a total reduction across the systems of each grid-connected energy consumer;

transmit a signal to each corresponding gateway device located at the determined location, the signal comprising data indicative of instructions for performing on-site energy dispatch.

18. The system of claim 17, wherein the instructions are configured to override a previously supplied site-level schedule and increase on-site energy asset usage.

19. The system of claim 17, wherein the at least one memory and the computer program code are further configured to, with the processor, cause the apparatus to:

receive a utility request, the utility request comprising at least a geographic area or set of substations and time period at which to reduce grid-supplied energy consumption; and perform fleet-level optimization to determine which one or more of the plurality of gateway apparatus to instruct to perform on-site energy dispatch and at what times, thus reducing grid-supplied energy consumption in consideration of net export restrictions where applicable; and providing one or more site-level schedules to each of a plurality of affected gateway apparatuses for facilitating control of on-site energy asset usage and grid-supplied electric consumption.

20. The system of claim 19, wherein fleet-level optimization comprises:
maximizing a sum of a total bill savings across all accounts and utility revenue minus amortized development cost.

21. The system of claim 19, wherein fleet-level optimization is a function of a bill savings amount of each of the grid-connected energy consumers.

22. The system of claim 19, wherein fleet-level optimization is a function of utility revenue, the utility revenue being a function of an amount of on-site energy dispatched.

23. The system of claim 19, wherein fleet-level optimization is a function of a development cost, the development cost being a function of one or more of on-site energy storage system cost, installation cost, maintenance cost, and operational cost.

24. A computer program product for performing fleet-level management for reducing grid-supplied energy consumption with a firm capacity reduction, the computer program product comprising at least one non-transitory computer-readable storage medium having computer-executable program code instructions stored therein, the computer-executable program code instructions comprising program code instructions for:
receiving or accessing input data from a plurality of gateway apparatus, the plurality of gateway apparatus comprising at least a first gateway apparatus located at a first location, the first location being on-site of a grid-connected energy consumer and the second gateway apparatus located at a second location, the second location being on a different site of the grid-connected energy consumer or a different grid-connected energy consumer, each of the plurality of gateway apparatus configured to control an on-site energy asset, comprising at least an energy asset device, to control use of on-site energy instead of grid-supplied energy consumption;
determining, as a function of the input data, a location of each grid-connected energy consumers at which to reduce grid-supplied energy consumption;
determining an amount of a reduction of grid-supplied energy consumption, and further allocate a total reduction across the systems of each grid-connected energy consumer;
transmitting a signal to each corresponding gateway device located at the determined location, the signal comprising data indicative of instructions for performing on-site energy dispatch.

25. The computer program product according to claim 24, wherein the instructions are configured to override a previously supplied site-level schedule and increase on-site energy asset usage.

26. The computer program product according to claim 24, wherein the computer-executable program code instructions further comprise program code instructions for:
receiving a utility request, the utility request comprising at least a geographic area or set of substations and time period at which to reduce grid-supplied energy consumption; and
performing fleet-level optimization to determine which one or more of the plurality of gateway apparatus to instruct to perform on-site energy dispatch and at what times, thus reducing grid-supplied energy consumption in consideration of net export restrictions where applicable; and
providing one or more site-level schedules to each of a plurality of affected gateway apparatuses for facilitating control of on-site energy asset usage and grid-supplied electric consumption.

27. The computer program product according to claim 26, wherein fleet-level optimization comprises:
maximizing a sum of a total bill savings across all accounts and utility revenue minus amortized development cost.

28. The computer program product according to claim 26, wherein fleet-level optimization is a function of a bill savings amount of each of the grid-connected energy consumers.

29. The computer program product according to claim 26, wherein fleet-level optimization is a function of utility revenue, the utility revenue being a function of an amount of on-site energy dispatched.

30. The computer program product according to claim 26, wherein fleet-level optimization is a function of a development cost, the development cost being a function of one or more of on-site energy storage system cost, installation cost, maintenance cost, and operational cost.

* * * * *